US010302672B2

(12) United States Patent
Kanemoto

(10) Patent No.: US 10,302,672 B2
(45) Date of Patent: May 28, 2019

(54) ANGULAR VELOCITY DETECTION CIRCUIT, ANGULAR VELOCITY DETECTION DEVICE, ELECTRONIC APPARATUS, AND MOVING OBJECT

(71) Applicant: Seiko Epson Corporation, Tokyo (JP)

(72) Inventor: Kei Kanemoto, Fujimi (JP)

(73) Assignee: Seiko Epson Corporation (JP)

( * ) Notice: Subject to any disclaimer, the term of this patent is extended or adjusted under 35 U.S.C. 154(b) by 164 days.

(21) Appl. No.: 15/440,140

(22) Filed: Feb. 23, 2017

(65) Prior Publication Data
US 2017/0254833 A1 Sep. 7, 2017

(30) Foreign Application Priority Data

Mar. 4, 2016 (JP) .................................. 2016-042347

(51) Int. Cl.
*G01P 21/02* (2006.01)
*G01P 3/44* (2006.01)
*G01C 19/574* (2012.01)
*G01C 25/00* (2006.01)

(52) U.S. Cl.
CPC ............ *G01P 21/02* (2013.01); *G01C 19/574* (2013.01); *G01C 25/005* (2013.01); *G01P 3/44* (2013.01)

(58) Field of Classification Search
CPC .......... G01P 21/00; G01P 15/18; G01P 21/02; G01P 3/44; G01C 25/005; G01C 19/5776; G01C 19/5726
USPC .......................................................... 73/1.37
See application file for complete search history.

(56) References Cited

U.S. PATENT DOCUMENTS

| 5,491,725 | A | * | 2/1996 | White | ................ | G01C 19/5607 |
| | | | | | | 327/553 |
| 5,893,054 | A | * | 4/1999 | White | ................ | G01C 19/5607 |
| | | | | | | 702/189 |
| 6,560,029 | B1 | * | 5/2003 | Dobbie | ................ | G02B 23/125 |
| | | | | | | 2/6.1 |
| 7,216,538 | B2 | | 5/2007 | Ito et al. | | |
| 8,701,487 | B2 | | 4/2014 | Naruse et al. | | |

(Continued)

FOREIGN PATENT DOCUMENTS

| JP | 2006-047144 A | 2/2006 |
| JP | 2011-137777 A | 7/2011 |
| JP | 2014-197010 A | 10/2014 |

*Primary Examiner* — Natalie Huls
*Assistant Examiner* — Mohammed E Keramet-Amircolai
(74) *Attorney, Agent, or Firm* — Harness, Dickey & Pierce, P.L.C.

(57) ABSTRACT

An angular velocity detection circuit includes: an angular velocity signal generation unit that generates an angular velocity signal on the basis of an output signal of a differential amplifier unit that differentially amplifies a signal based on an output signal of a first conversion unit and a signal based on an output signal of a second conversion unit; and a correction signal generation unit that generates a correction signal for reducing an offset of the angular velocity signal which occurs due to leakage signals which are respectively included in the first detection signal and the second detection signal on the basis of a signal based on drive oscillation of the angular velocity detection element. The correction signal is input to a circuit that is located on a first signal path ranging from the first detection electrode of an angular velocity detection element to the differential amplifier unit.

12 Claims, 14 Drawing Sheets

(56) References Cited

U.S. PATENT DOCUMENTS

| | | | |
|---|---|---|---|
| 2007/0180908 A1 | 8/2007 | Seeger et al. | |
| 2010/0064405 A1* | 3/2010 | McGovern | A42B 3/225 |
| | | | 2/6.7 |
| 2012/0055230 A1* | 3/2012 | Naruse | G01C 19/5726 |
| | | | 73/1.37 |
| 2015/0157079 A1* | 6/2015 | Auranen | F41H 1/04 |
| | | | 2/422 |
| 2015/0212526 A1* | 7/2015 | Kanemoto | G05D 19/02 |
| | | | 700/280 |

* cited by examiner

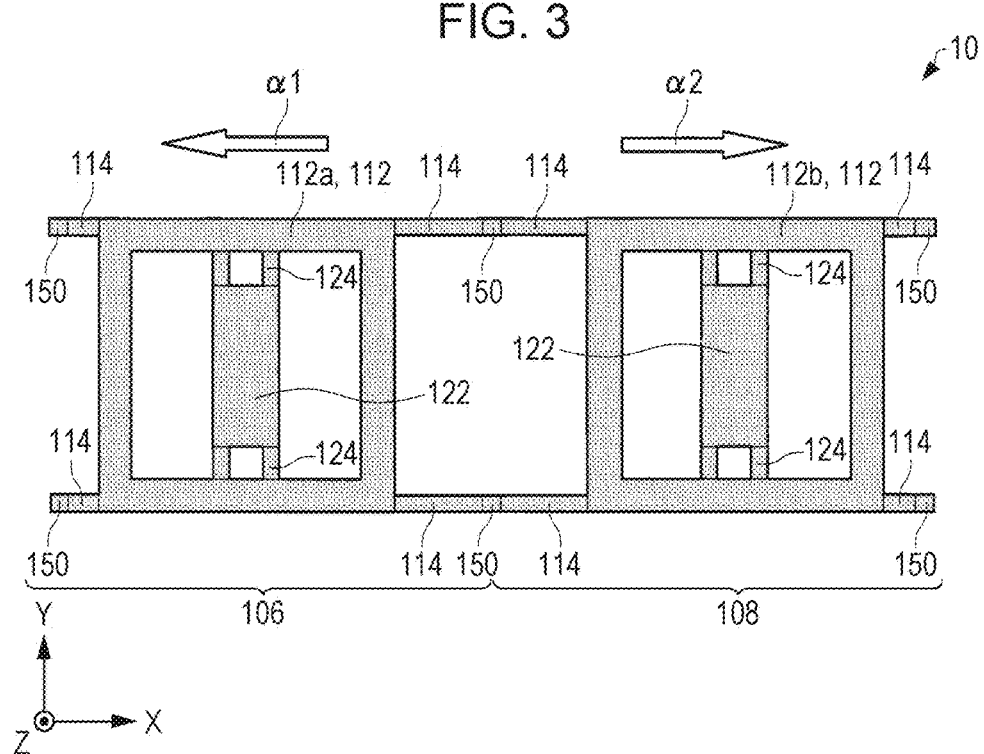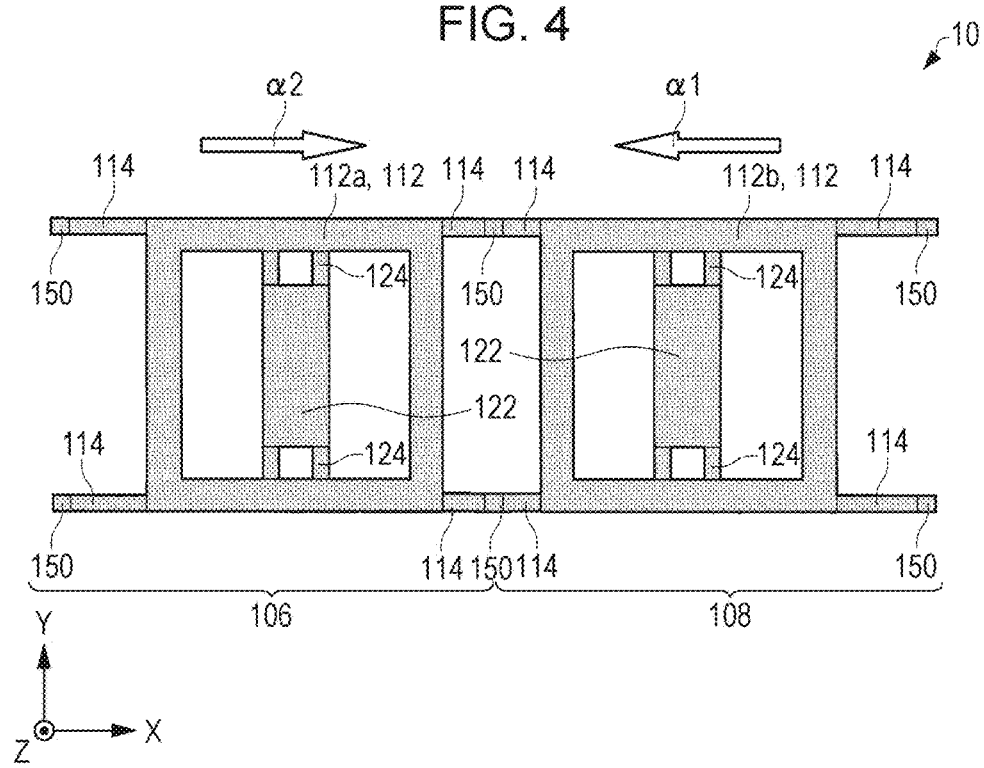

ANGULAR VELOCITY DETECTION CIRCUIT, ANGULAR VELOCITY DETECTION DEVICE, ELECTRONIC APPARATUS, AND MOVING OBJECT

BACKGROUND

1. Technical Field

The present invention relates to an angular velocity detection circuit, an angular velocity detection device, an electronic apparatus, and a moving object.

2. Related Art

Recently, for example, an angular velocity sensor (gyro sensor), which detects an angular velocity by using a silicon micro electromechanical system (MEMS) technology, has been developed.

U.S. Patent Application Publication No. 2007/0180908 discloses a technology of inputting a quadrature error cancel signal on a front stage side (between a detection mass unit and a C/V conversion circuit) of a detection circuit with capacitive coupling to reduce a quadrature signal that is included in an output signal of the detection mass unit.

However, in the gyro sensor described in U.S. Patent Application Publication No. 2007/0180908, an output signal of a detection mass unit is one. With regard to an angular velocity detection device provided with an angular velocity detection element that outputs a plurality of detection signals (for example, two detection signals of which phases are inverted from each other), U.S. Patent Application Publication No. 2007/0180908 does not disclose a method of reducing quadrature signals which are respectively included in the plurality of detection signals.

SUMMARY

An advantage of some aspects of the invention is to provide an angular velocity detection circuit and an angular velocity detection device which are capable of improving S/N of an output signal generated on the basis of a plurality of detection signals output from an angular velocity detection element. Another advantage of some aspects of the invention is to provide an electronic apparatus and a moving object which use the angular velocity detection device.

The invention can be realized in the following aspects or application examples.

Application Example 1

According to this application example, there is provided an angular velocity detection circuit including: a first conversion unit that converts a first detection signal, which is output from a first detection electrode of an angular velocity detection element, into a voltage; a second conversion unit that converts a second detection signal, which is output from a second detection electrode of the angular velocity detection element, into a voltage; an angular velocity signal generation unit which includes a differential amplifier unit that differentially amplifies a signal based on an output signal of the first conversion unit and a signal based on an output signal of the second conversion unit, and which generates an angular velocity signal on the basis of an output signal of the differential amplifier unit; and a correction signal generation unit that generates a correction signal for reducing an offset of the angular velocity signal that occurs due to leakage signals which are respectively included in the first detection signal and the second detection signal on the basis of a signal based on drive oscillation of the angular velocity detection element. The correction signal is input to a circuit that is located on a first signal path ranging from the first detection electrode to the differential amplifier unit.

For example, the first conversion unit may be a Q/V converter (charge amplifier) that converts a charge into a voltage or an I/V converter that converts a current into a voltage. Similarly, for example, the second conversion unit may be a Q/V converter (charge amplifier) that converts a charge into a voltage or an I/V converter that converts a current into a voltage.

Application Example 2

In the angular velocity detection circuit according to the application example, the correction signal may be input to a circuit on a rear stage side of the first conversion unit.

Application Example 3

The angular velocity detection circuit according to the application example may further includes an addition circuit that is provided on the first signal path, and adds an output signal of the first conversion unit and the correction signal to each other.

According to the angular velocity detection circuit according to this application example, since the correction signal is input to the circuit (a circuit or the addition circuit on a rear stage side of the first conversion unit) on the first signal path ranging from the first detection electrode of the angular velocity detection element to the differential amplifier unit, it is possible to reduce an offset of an angular velocity signal which occurs due to leakage signals which are respectively included in the first detection signal and the second detection signal. Accordingly, according to the angular velocity detection circuit according to this application example, a ratio between an angular velocity component (Coriolis signal) and a noise component which are included in an output signal of the differential amplifier unit, increases. As a result, it is possible to improve S/N of the angular velocity signal that is generated on the basis of the output signal of the differential amplifier unit.

Application Example 4

In the angular velocity detection circuit according to the application example, the correction signal may not be input to a circuit that is located on a second signal path ranging from the second detection electrode to the differential amplifier unit.

According to the angular velocity detection circuit according to this application example, since it is not necessary to provide a circuit, to which a correction signal is input, on the second signal path ranging from the second detection electrode to the differential amplifier unit, and thus it is possible to reduce a circuit area.

Application Example 5

In the angular velocity detection circuit according to the application example, the correction signal generation unit may include an amplitude adjustment unit that adjusts an amplitude of the correction signal.

According to the angular velocity detection circuit according to this application example, since a correction signal, of which an amplitude is adjusted by the amplitude adjustment unit, is generated, a leakage signal is further attenuated in an output signal of the differential amplifier unit. As a result, it is possible to further improve S/N of the angular velocity signal.

Application Example 6

In the angular velocity detection circuit according to the application example, the correction signal generation unit may include a synchronous detection circuit that detects a level of the leakage signal that is included in the first detection signal and the second detection signal on the basis of an output signal of the differential amplifier unit, and the amplitude adjustment unit may adjust an amplitude of the correction signal on the basis of the level of the leakage signal which is detected by the synchronous detection circuit.

According to the angular velocity detection circuit according to this application example, even when the amplitude of the leakage signals which are respectively included in the first detection signal and the second detection signal varies, the amplitude of the correction signal is adjusted in conformity to the variation. Accordingly, even when an environment varies, it is possible to constantly maintain S/N of the angular velocity signal.

In addition, according to the angular velocity detection circuit according to this application example, a level of a leakage signal included in the first detection signal and a level of a leakage signal the second detection signal are collectively detected by one synchronous detection circuit on the basis of the output signal of the differential amplifier unit. According to this, it is possible to further reduce a circuit area in comparison to a configuration in which a level of a leakage signal included in the first detection signal and a level of a leakage signal included in the second detection signal are individually detected by two synchronous detection circuits.

In addition, according to the angular velocity detection circuit according to this application example, in a process of manufacturing the angular velocity detection circuit, it is not necessary to inspect the amplitude of the leakage signals which are respectively included in the first detection signal and the second detection signal to set information for adjusting the amplitude of the correction signal, and thus it is also possible to reduce the manufacturing cost.

Application Example 7

In the angular velocity detection circuit according to the application example, the amplitude adjustment unit may adjust the amplitude of the correction signal on the basis of information that is stored in a storage unit.

According to the angular velocity detection circuit according to this application example, for example, in a process of manufacturing the angular velocity detection circuit, the amplitude of the leakage signals which are respectively included in the first detection signal and the second detection signal is inspected, and information corresponding to the amplitude of the leakage signals is stored in the storage unit. Accordingly, it is possible to improve S/N of the angular velocity signal.

In addition, according to the angular velocity detection circuit according to this application example, when the amplitude or the phase of the leakage signals which are respectively included in the first detection signal and the second detection signal varies due to an environmental variation, an amplitude or a phase of a signal based on drive oscillation of the angular velocity detection element also varies. Accordingly, even when the level of the leakage signal is not detected, it is possible to constantly maintain S/N of the angular velocity signal to a certain extent. As a result, according to the angular velocity detection circuit according to this application example, a circuit, which detects the level of the leakage signals which are respectively included in the first detection signal and the second detection signal, is not necessary, and thus it is also possible to reduce a circuit area.

Application Example 8

In the angular velocity detection circuit according to the application example, the correction signal generation unit may include a phase adjustment unit that adjusts a phase of the correction signal.

For example, the phase adjustment unit may adjust the phase of the correction signal on the basis of the level of the leakage signals which is detected by the synchronous detection circuit, or may adjust the phase of the correction signal on the basis of information that is stored in the storage unit.

According to the angular velocity detection circuit according to this application example, since the correction signal of which a phase is adjusted by the phase adjustment unit is generated, the leakage signal is further attenuated in the output signal of the differential amplifier unit. As a result, it is possible to further improve S/N of the angular velocity signal.

Application Example 9

In the angular velocity detection circuit according to the application example, a power supply voltage of the first conversion unit and the second conversion unit may be higher than a power supply voltage of the differential amplifier unit.

According to the angular velocity detection circuit according to this application example, it is possible to further enlarge a gain of the first conversion unit and the second conversion unit in comparison to a case where the power supply voltage of the first conversion unit and the second conversion unit is the same as the power supply voltage of the differential amplifier unit. That is, a Coriolis signal and a leakage signal are relatively greatly amplified due to the first conversion unit and the second conversion unit, but the leakage signal is greatly attenuated due to the correction signal. As a result, it is possible to further improve S/N of the angular velocity signal.

Application Example 10

According to this application example, there is provided an angular velocity detection device including: any one of the angular velocity detection circuits, a drive circuit that drives the angular velocity detection element, and the angular velocity detection element.

The angular velocity detection device according to this application example includes any one of the angular velocity detection circuit, and thus it is possible to improve S/N of the angular velocity signal.

Application Example 11

According to this application example, there is provided an electronic apparatus including the angular velocity detection device.

Application Example 12

According to this application example, there is provided a moving object including the angular velocity detection device.

According to these application examples, the angular velocity detection device capable of improving S/N of the angular velocity signal is provided. Accordingly, for example, it is also possible to realize the electronic apparatus and the moving object which are capable of performing processing based on a variation of an angular velocity with higher accuracy.

BRIEF DESCRIPTION OF THE DRAWINGS

The invention will be described with reference to the accompanying drawings, wherein like numbers reference like elements.

FIG. 3 is a view illustrating an operation of the angular velocity detection element.

FIG. 4 is a view illustrating an operation of the angular velocity detection element.

DESCRIPTION OF EXEMPLARY EMBODIMENTS

Hereinafter, preferred embodiments of the invention will be described in detail with reference to the accompanying drawings. Furthermore, the following embodiments are not intended to limit the contents of the invention which are described in claims. In addition, it cannot be said that the entirety of configurations to be described below are essential configuration elements of the invention.

1. Angular Velocity Detection Device

1-1. First Embodiment

Configuration and Operation of Angular Velocity Detection Element

Figure 1:
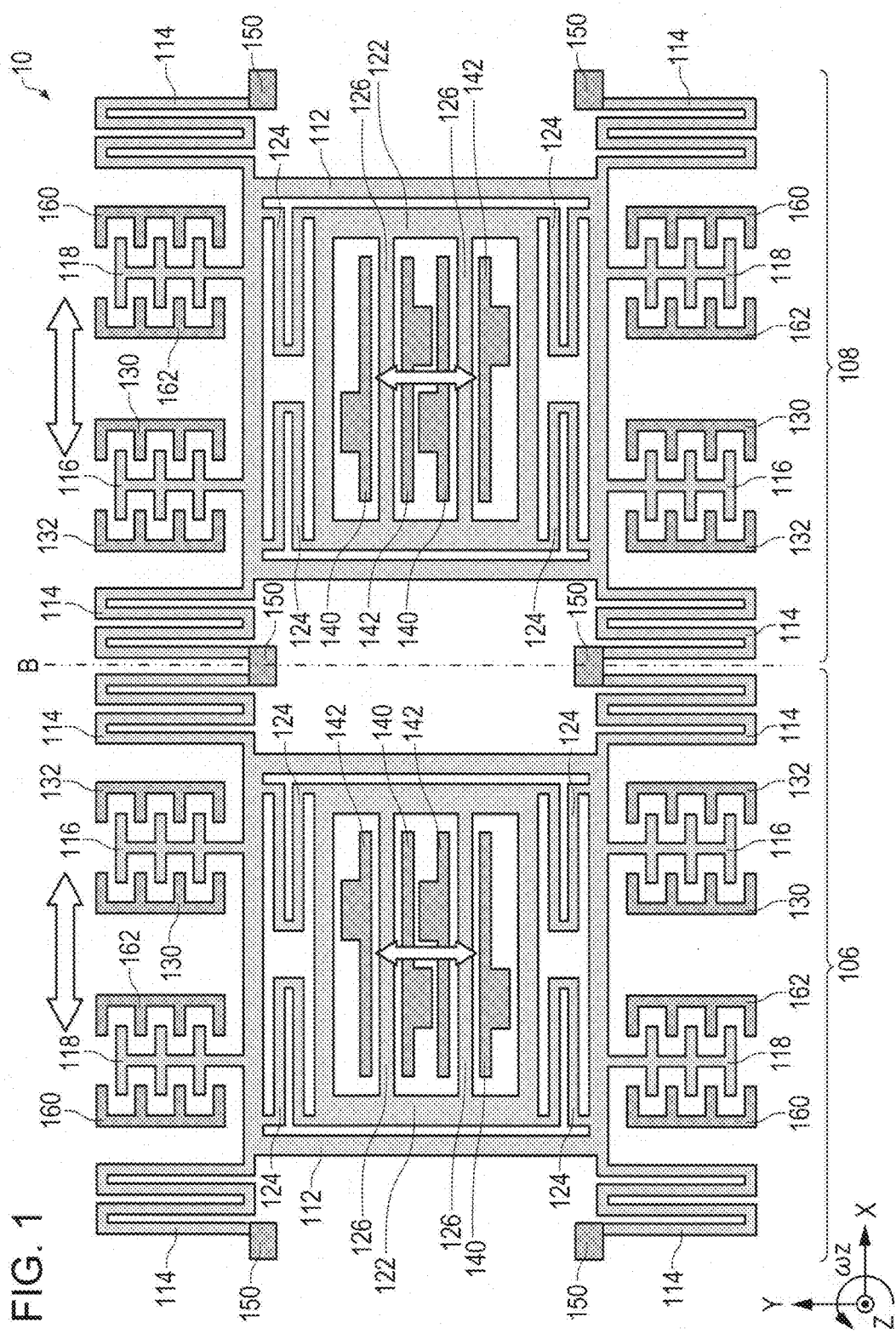
FIG. 1 is a plan view schematically illustrating an angular velocity detection element.
Figure 2:
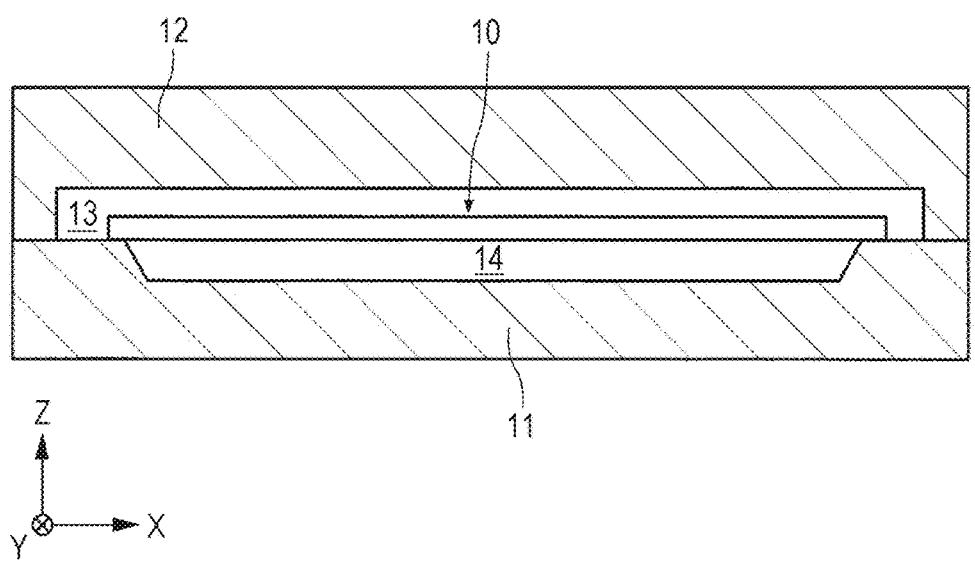
FIG. 2 is a cross-sectional view schematically illustrating the angular velocity detection element.

First, description will be given of an angular velocity detection element 10 that is included in an angular velocity detection device 1 according to this embodiment with reference to the accompanying drawings. FIG. 1 is a plan view schematically illustrating the angular velocity detection element 10. FIG. 2 is a cross-sectional view schematically illustrating the angular velocity detection element 10. Furthermore, in FIG. 1, an X-axis, a Y-axis, and a Z-axis are illustrated as three axes perpendicular to each other. Hereinafter, description will be given of an example in which the angular velocity detection element 10 is an electrostatic capacitive MEMS element that detects an angular velocity of Z-axis rotation.

As illustrated in FIG. 2, the angular velocity detection element 10 is provided on a substrate 11, and is accommodated in an accommodation portion that is constituted by the substrate 11 and a lid 12. For example, a cavity 13, which is an inner space of the accommodation portion, is evacuated and is hermetically closed. Examples of a material of the substrate 11 include glass and silicon. Examples of a material of the lid 12 include silicon and glass.

As illustrated in FIG. 1, the angular velocity detection element 10 includes an oscillating body 112, a stationary drive electrode 130, a stationary drive electrode 132, a movable drive electrode 116, a stationary monitor electrode 160, a stationary monitor electrode 162, a movable monitor electrode 118, a stationary detection electrode 140, a stationary detection electrode 142, and a movable detection electrode 126.

As illustrated in FIG. 1, the angular velocity detection element 10 includes a first structure body 106 and a second structure body 108. The first structure body 106 and the second structure body 108 are connected to each other along the X-axis. The first structure body 106 is located on a −X direction side in comparison to the second structure body 108. For example, the structure bodies 106 and 108 have shapes symmetrical to a boundary line B (straight line along the Y-axis) thereof. Furthermore, although not illustrated, the angular velocity detection element 10 may be constituted by the first structure body 106 without being provided with the second structure body 108.

Each of the structure bodies 106 and 108 includes the oscillating body 112, a first spring unit 114, the movable drive electrode 116, a displacement unit 122, a second spring unit 124, the stationary drive electrodes 130 and 132, movable oscillation detection electrodes 118 and 126, stationary oscillation detection electrodes 140, 142, 160, and 162, and a fixing unit 150. The movable oscillation detection electrodes 118 and 126 are classified into the movable monitor electrode 118 and the movable detection electrode 126. The stationary oscillation detection electrodes 140, 142, 160, and 162 are classified into the stationary detection electrodes 140 and 142, and the stationary monitor electrodes 160 and 162.

For example, the oscillating body 112, the spring units 114 and 124, the movable drive electrode 116, the movable monitor electrode 118, the displacement unit 122, the movable detection electrode 126, and the fixing unit 150 are integrally formed by processing a silicon substrate (not illustrated) that is bonded to the substrate 11. According to this, a minute processing technology, which is used in manufacturing of a silicon semiconductor device, is applicable, and thus it is possible to realize miniaturization of the angular velocity detection element 10. Examples of a material of the angular velocity detection element 10 include silicon to which conductivity is applied through doping with an impurity such as phosphorus and boron. Furthermore, the movable drive electrode 116, the movable monitor electrode 118, and the movable detection electrode 126 may be provided on a surface of the oscillating body 112 and the like as a separate member from the oscillating body 112.

For example, the oscillating body 112 has a frame shape. The displacement unit 122, the movable detection electrode 126, and the stationary detection electrodes 140 and 142 are provided on an inner side of the oscillating body 112.

One end of the first spring unit 114 is connected to the oscillating body 112, and the other end thereof is connected to the fixing unit 150. The fixing unit 150 is fixed onto the substrate 11. That is, the concave portion (refer to FIG. 2) is not provided on a lower side of the fixing unit 150. The oscillating body 112 is supported by the fixing unit 150 through the first spring unit 114. In the example illustrated in the drawing, the first spring unit 114 is provided in a number of four in each of the first structure body 106 and the second structure body 108. Furthermore, the fixing unit 150 on a boundary line B between the first structure body 106 and the second structure body 108 may not be provided.

The first spring unit 114 has a configuration capable of displacing the oscillating body 112 in the X-axis direction. More specifically, the first spring unit 114 has a shape that extends in the X-axis direction (along the X-axis) while reciprocating in the Y-axis direction (along the Y-axis). Furthermore, the number of the first spring unit 114 is not particularly limited as long as the first spring unit 114 can allow the oscillating body 112 to oscillate along the X-axis.

The movable drive electrode 116 is connected to the oscillating body 112. The movable drive electrode 116 extends from the oscillating body 112 in a +Y direction and a −Y direction. A plurality of the movable drive electrodes 116 may be provided, and the plurality of movable drive electrodes 116 may be arranged in the X-axis direction. The movable drive electrode 116 can oscillate along the X-axis in accordance with oscillation of the oscillating body 112.

The stationary drive electrodes 130 and 132 are fixed onto the substrate 11, and are provided on a +Y direction side of the oscillating body 112 and on a −Y direction side of the oscillating body 112.

The stationary drive electrodes 130 and 132 are provided to face the movable drive electrode 116 with the movable drive electrode 116 interposed therebetween. More specifically, with regard to the stationary drive electrodes 130 and 132 between which the movable drive electrode 116 is interposed, in the first structure body 106, the stationary drive electrode 130 is provided on a −X direction side of the movable drive electrode 116, and the stationary drive electrode 132 is provided on a +X direction side of the movable drive electrode 116. In the second structure body 108, the stationary drive electrode 130 is provided on the +X direction side of the movable drive electrode 116, and the stationary drive electrode 132 is provided on the −X direction side of the movable drive electrode 116.

In the example illustrated in FIG. 1, the stationary drive electrodes 130 and 132 have a comb tooth-like shape, and the movable drive electrode 116 has a shape capable of being inserted between teeth of the stationary drive electrodes 130 and 132. A plurality of the stationary drive electrodes 130 and 132 may be provided in correspondence with the number of the movable drive electrode 116, and may be arranged in the X-axis direction. The stationary drive electrodes 130 and 132, and the movable drive electrode 116 are electrodes to oscillate the oscillating body 112.

The movable monitor electrode 118 is connected to the oscillating body 112. The movable monitor electrode 118 extends from the oscillating body 112 in the +Y direction and the −Y direction. In the example illustrated in FIG. 1, the movable monitor electrode 118 is provided on the +Y direction side of the oscillating body 112 in the first structure body 106, and on the +Y direction side of the oscillating body 112 in the second structure body 108 one by one, and the plurality of movable drive electrodes 116 are arranged between the movable monitor electrodes 118. In addition, the movable monitor electrode 118 is provided on the −Y direction side of the oscillating body 112 in the first structure body 106 and the −Y direction side of the oscillating body 112 in the second structure body 108 one by one, and the plurality of movable drive electrodes 116 are arranged between the movable monitor electrodes 118. For example, a planar shape of each of the movable monitor electrodes 118 is the same as a planar shape of the movable drive electrode 116. The movable monitor electrode 118 oscillates, that is, reciprocates along the X-axis in accordance with oscillation of the oscillating body 112.

The stationary monitor electrodes 160 and 162 are fixed onto the substrate 11, and are provided on the +Y direction side of the oscillating body 112 and the −Y direction side of the oscillating body 112.

The stationary monitor electrodes 160 and 162 are provided to face the movable monitor electrode 118 with the movable monitor electrode 118 interposed therebetween. More specifically, with regard to the stationary monitor electrodes 160 and 162 between which the movable monitor electrode 118 is interposed, in the first structure body 106, the stationary monitor electrode 160 is provided on the −X direction side of the movable monitor electrode 118, and the stationary monitor electrode 162 is provided on the +X direction side of the movable monitor electrode 118. In the second structure body 108, the stationary monitor electrode 160 is provided on the +X direction side of the movable monitor electrode 118, and the stationary monitor electrode 162 is provided on the −X direction side of the movable monitor electrode 118.

The stationary monitor electrodes 160 and 162 have a comb tooth-like shape, and the movable monitor electrode 118 has a shape capable of being inserted between teeth of the stationary monitor electrodes 160 and 162.

The stationary monitor electrodes 160 and 162, and the movable monitor electrode 118 are electrodes which detect a signal that varies in correspondence with oscillation of the oscillating body 112, and are electrodes which detect an oscillation state of the oscillating body 112. More specifically, when the movable monitor electrode 118 displaces along the X-axis, electrostatic capacitance between the movable monitor electrode 118 and the stationary monitor electrode 160, and electrostatic capacitance between the movable monitor electrode 118 and the stationary monitor electrode 162 vary. According to this, a current of the stationary monitor electrodes 160 and 162 varies. As a result, it is possible to detect the oscillation state of the oscillating body 112 through detection of a variation of the current.

The displacement unit 122 is connected to the oscillating body 112 with the second spring unit 124 interposed therebetween. In the example illustrated in the drawing, a planar shape of the displacement unit 122 is a rectangle having long sides along the Y-axis. Furthermore, although not illustrated, the displacement unit 122 may be provided on an outer side of the oscillating body 112.

The second spring unit 124 is configured to displace the displacement unit 122 in the Y-axis direction. More specifically, the second spring unit 124 has a shape that extends in the Y-axis direction while reciprocating in the X-axis direction. Furthermore, the number of the second spring unit 124 is not particularly limited as long as the second spring unit 124 can allow the displacement unit 122 to displace along the Y-axis.

The movable detection electrode 126 is connected to the displacement unit 122. For example, a plurality of the movable detection electrodes 126 are provided. Each of the movable detection electrodes 126 extends from the displacement unit 122 along the +X direction and the −X direction.

The stationary detection electrodes 140 and 142 are fixed onto the substrate 11. More specifically, ends on one side of the stationary detection electrodes 140 and 142 are fixed onto the substrate 11, and ends on the other side extend to a displacement unit 122 side as free ends.

The stationary detection electrodes 140 and 142 are provided to face the movable detection electrode 126 with the movable detection electrode 126 interposed therebetween. More specifically, with regard to the stationary detection electrodes 140 and 142 between which the movable detection electrode 126 is interposed, in the first structure body 106, the stationary detection electrode 140 is provided on the −Y direction side of the movable detection electrode 126, and the stationary detection electrode 142 is provided on the +Y direction side of the movable detection electrode 126. In the second structure body 108, the stationary detection electrode 140 is provided on the +Y direction side of the movable detection electrode 126, and the stationary detection electrode 142 is provided on the −Y direction side of the movable detection electrode 126.

In the example illustrated in FIG. 1, a plurality of the stationary detection electrodes 140 and 142 are provided, and are alternately arranged along the Y-axis. The stationary detection electrodes 140 and 142, and the movable detection electrode 126 are electrodes which detect a signal (electrostatic capacitance) that varies in correspondence with oscillation of the oscillating body 112.

Next, description will be given of an operation of the angular velocity detection element 10. FIG. 3 to FIG. 6 are views illustrating the operation of the angular velocity detection element 10. Furthermore, in FIG. 3 to FIG. 6, the X-axis, the Y-axis, and the Z-axis are illustrated as three axes perpendicular to each other. In addition, in FIG. 3 to FIG. 6, the movable drive electrode 116, the movable monitor electrode 118, the movable detection electrode 126, the stationary drive electrodes 130 and 132, the stationary detection electrodes 140 and 142, and the stationary monitor electrodes 160 and 162 are not illustrated for convenience, and the angular velocity detection element 10 is illustrated in a simple manner.

When a voltage is applied between the movable drive electrode 116, and the stationary drive electrodes 130 and 132 by a power supply (not illustrated), an electrostatic force can be generated between the movable drive electrode 116, and the stationary drive electrodes 130 and 132 (refer to FIG. 1). According to this, as illustrated in FIG. 3 and FIG. 4, it is possible to extract and contract the first spring unit 114 along the X-axis, and it is possible to allow the oscillating body 112 to oscillate along the X-axis.

More specifically, a constant bias voltage Vr is applied to the movable drive electrode 116. In addition, a first AC voltage is applied to the stationary drive electrode 130 through a drive interconnection (not illustrated) on the basis of a predetermined voltage. In addition, a second AC voltage, of which a phase deviates from that of the first AC voltage by 180°, is applied to the stationary drive electrode 132 through a drive interconnection (not illustrated) on the basis of a predetermined voltage.

Here, with regard to the stationary drive electrodes 130 and 132 between which the movable drive electrode 116 is interposed, in the first structure body 106, the stationary drive electrode 130 is provided on the −X direction side of the movable drive electrode 116, and the stationary drive electrode 132 is provided on the +X direction side of the movable drive electrode 116 (refer to FIG. 1). In the second structure body 108, the stationary drive electrode 130 is provided on the +X direction side of the movable drive electrode 116, and the stationary drive electrode 132 is provided on the −X direction side of the movable drive electrode 116 (refer to FIG. 1). According to this, it is possible to allow an oscillating body 112a of the first structure body 106 and an oscillating body 112b of the second structure body 108 to oscillate along the X-axis in phases reversed from each other and at a predetermined frequency due to the first AC voltage and the second AC voltage. In an example illustrated in FIG. 3, the oscillating body 112a displaces in an α1 direction, and the oscillating body 112b displaces in an α2 direction that is opposite to the α1 direction. In an example illustrated in FIG. 4, the oscillating body 112a displaces in the α2 direction, and the oscillating body 112b displaces in the α1 direction.

Furthermore, the displacement unit 122 displaces along the X-axis in accordance with oscillation of the oscillating body 112. Similarly, the movable detection electrode 126 (refer to FIG. 1) displaces along the X-axis in accordance with oscillation of the oscillating body 112.

Figure 5:
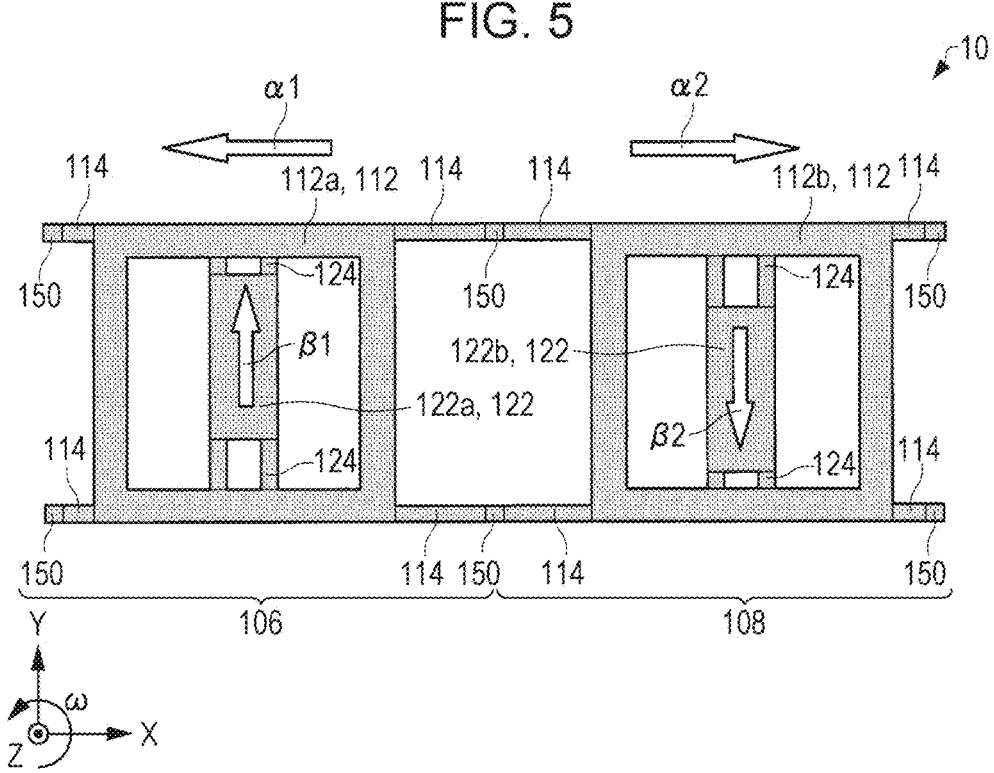
FIG. 5 is a view illustrating an operation of the angular velocity detection element.
Figure 6:
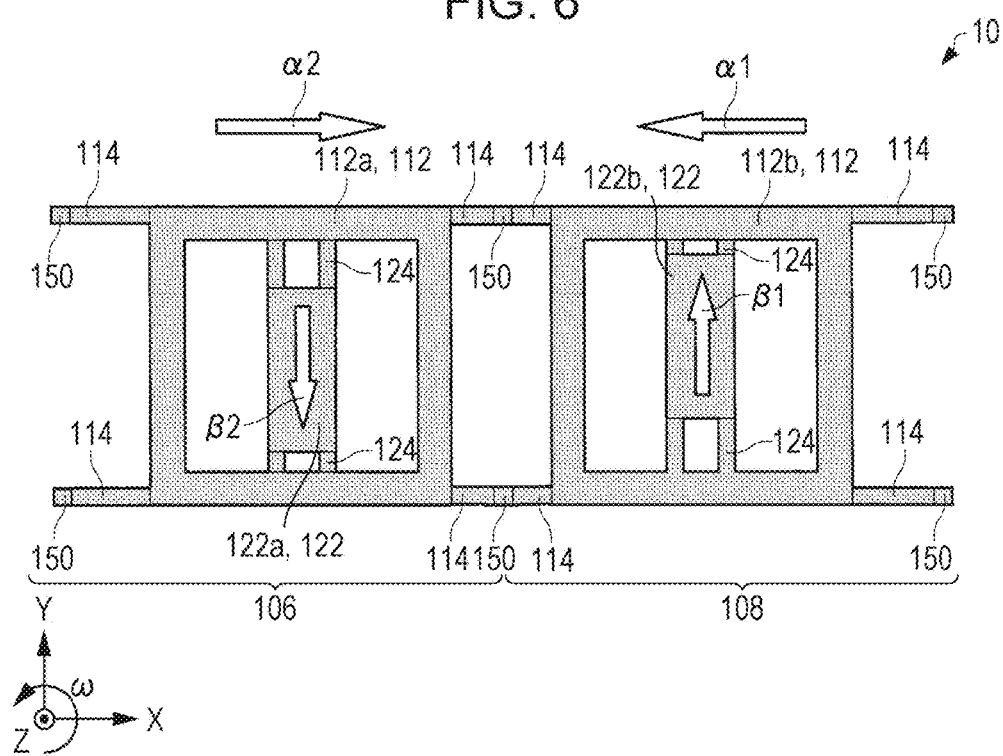
FIG. 6 is a view illustrating an operation of the angular velocity detection element.

As illustrated in FIG. 5 and FIG. 6, when an angular velocity ω of Z-axis rotation is applied to the angular velocity detection element 10 in a state in which the oscillating bodies 112a and 112b oscillate along the X-axis, a Coriolis force acts thereon, and thus the displacement unit 122 displaces along the Y-axis. That is, a displacement unit 122a connected to the oscillating body 112a and a displacement unit 122b connected to the oscillating body 112b displace along the Y-axis in directions opposite to each other. In an example illustrated in FIG. 5, the displacement unit 122a displaces in a β1 direction, and the displacement unit 122b displaces in a β2 direction opposite to the β1 direction. In an example illustrated in FIG. 6, the displacement unit 122a displaces in the β2 direction, and the second displacement unit 122b displaces in the β1 direction.

When the displacement units 122a and 122b displace along the Y-axis, a distance between the movable detection electrode 126 and the stationary detection electrode 140 varies (refer to FIG. 1). Similarly, a distance between the movable detection electrode 126 and the stationary detection electrode 142 varies (refer to FIG. 1). According to this, electrostatic capacitance between the movable detection electrode 126 and the stationary detection electrode 140 varies. Similarly, electrostatic capacitance between the movable detection electrode 126 and the stationary detection electrode 142 varies.

In the angular velocity detection element 10, it is possible to detect a variation amount of electrostatic capacitance between the movable detection electrode 126 and the stationary detection electrode 140 by applying a voltage between the movable detection electrode 126 and the stationary detection electrode 140 (refer to FIG. 1). In addition, it is possible to detect a variation amount of electrostatic capacitance between the movable detection electrode 126 and the stationary detection electrode 142 by applying a voltage between the movable detection electrode 126 and the stationary detection electrode 142 (refer to FIG. 1). In this manner, the angular velocity detection element 10 can obtain the angular velocity ω of the Z-axis rotation in accordance with the variation amount of the electrostatic capacitance between the movable detection electrode 126, and each of the stationary detection electrodes 140 and 142.

In addition, in the angular velocity detection element 10, when the oscillating bodies 112a and 112b oscillate along the X-axis, a distance between the movable monitor electrode 118 and the stationary monitor electrode 160 varies (refer to FIG. 1). Similarly, a distance between the movable monitor electrode 118 and the stationary monitor electrode 162 varies (refer to FIG. 1). According to this, electrostatic capacitance between the movable monitor electrode 118 and the stationary monitor electrode 160 varies. Similarly, electrostatic capacitance between the movable monitor electrode 118 and the stationary monitor electrode 162 varies. In accordance with the variation, a current that flows to the stationary monitor electrodes 160 and 162 varies. It is possible to detect (monitor) an oscillation state of the oscillating bodies 112a and 112b in accordance with the variation of the current.

In the angular velocity detection element 10, as illustrated in FIG. 1, the stationary detection electrodes 140 and 142 are provided in regions on both sides of reciprocating motion ends of the movable detection electrode 126.

Configuration and Operation of Angular Velocity Detection Device

Figure 7:
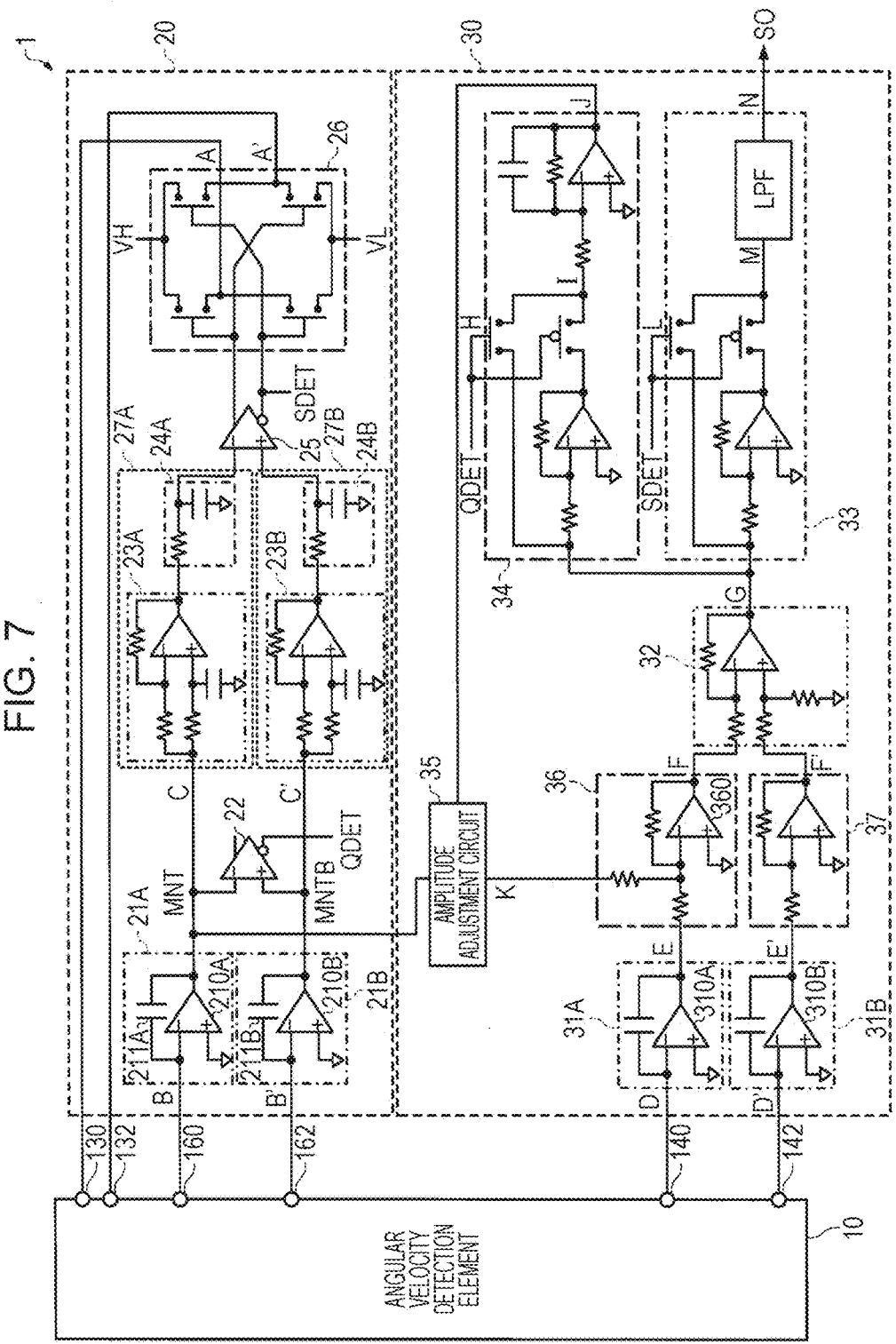
FIG. 7 is a view illustrating a configuration of an angular velocity detection device according to a first embodiment.

FIG. 7 is a view illustrating a configuration of an angular velocity detection device 1 according to the first embodiment. As illustrated in FIG. 7, the angular velocity detection device 1 according to the first embodiment includes the angular velocity detection element 10 illustrated in FIG. 1, a drive circuit 20, and an angular velocity detection circuit 30.

The drive circuit 20 generates a drive signal on the basis of a signal transmitted from the stationary monitor electrodes 160 and 162 of the angular velocity detection element 10, and outputs the drive signal to the stationary drive electrodes 130 and 132. The drive circuit outputs the drive signal to drive the angular velocity detection element 10, and receives a feedback signal from the angular velocity detection element 10. According to this, the angular velocity detection element 10 is excited.

The angular velocity detection circuit 30 receives a detection signal output from the angular velocity detection element 10 that is driven by the drive signal, and attenuates a quadrature signal (leakage signal) based on oscillation from the detection signal, and extracts a Coriolis signal based on the Coriolis force, thereby generating an angular velocity signal SO.

The drive circuit 20 in this embodiment includes two Q/V converters (charge amplifiers) 21A and 21B, a comparator 22, two phase shift circuits 23A and 23B, two band limiting filters 24A and 24B, a comparator 25, and a level conversion circuit 26.

When the oscillating body 112 of the angular velocity detection element 10 oscillates, currents, which are based on a capacitance variation and of which phases are inverted from each other, are output from the stationary monitor electrodes 160 and 162 as a feedback signal.

The Q/V converter 21A includes an operational amplifier 210A and a capacitor 211A, stores a current (charge), which is output from the stationary monitor electrode 160 of the angular velocity detection element 10 and is input to an inverting input terminal of the operational amplifier 210A, in the capacitor 211A, and converts the current into a voltage. Similarly, the Q/V converter 31B includes an operational amplifier 210B and a capacitor 211B, stores a current (charge), which is output from the stationary monitor electrode 162 of the angular velocity detection element 10 and is input to an inverting input terminal of the operational amplifier 210B, in the capacitor 211B, and converts the current into a voltage. Specifically, the Q/V converters 21A and 21B converts the current (charge), which is input, into a voltage based on an analog ground voltage AGND, and outputs AC voltage signals MNT and MNTB of the same frequency as an oscillation frequency of the oscillating body 112. The AC voltage signals MNT and MNTB are signals of which a phase advances by 90° with respect to the AC currents which are output from the stationary monitor electrodes 160 and 162.

The AC voltage signals MNT and MNTB, which are respectively output from the Q/V converters 21A and 21B, are input to the comparator 22. The comparator 22 compares a voltage of the AC voltage signal MNT and a voltage of the AC voltage signal MNTB, and outputs rectangular waveform signals, of which phases are inverted from each other, from a non-inverting output terminal and an inverting output terminal. In an example illustrated in FIG. 7, a rectangular waveform signal, which is output from the inverting output terminal of the comparator 22, is used as a quadrature reference signal QDET to be described later. When the voltage of the AC voltage signal MNT is higher than the voltage of the AC voltage signal MNTB, the quadrature reference signal QDET becomes a high level. When the voltage of the AC voltage signal MNT is lower than the voltage of the AC voltage signal MNTB, the quadrature reference signal QDET becomes a low level.

In addition, the AC voltage signals MNT and MNTB are respectively input to phase shift circuits 23A and 23B. The phase shift circuit 23A is a circuit that adjusts a phase of a drive signal, and outputs a signal in which a phase of the AC voltage signal MNT is shifted. Similarly, the phase shift circuit 23B is a circuit that adjusts a phase of a drive signal, and outputs a signal in which a phase of the AC voltage signal MNTB is shifted. In the example illustrated in FIG. 7, the phase shift circuits 23A and 23B are all-pass filters which allow pass signals of a full-frequency band to pass therethrough, but may be a circuit other than the filter.

The output signals of the phase shift circuits 23A and 23B are respectively input to band limiting filters 24A and 24B. The band limiting filter 24A is a circuit that limits a frequency band of the drive signal, allows a signal, which is included in the output signal of the phase shift circuit 23A and has the same frequency as that of an oscillation frequency, to pass therethrough, and attenuates a noise signal. Similarly, the band limiting filter 24B is a circuit that limits the frequency band of the drive signal, allows a signal, which is included in the output signal of the phase shift circuit 23B and has the same frequency as that of the oscillation frequency, to pass therethrough, and attenuates a noise signal. Particularly, in the example illustrated in FIG. 7, the band limiting filters 24A and 24B are set to a low-pass filter so as to attenuate a noise signal of a high frequency band, but may be set to a band-pass filter so as to attenuate a noise signal of a low frequency band.

As described above, since the AC voltage signal MNT is a signal of which a phase advances by 90° with respect to the AC current that is output from the stationary monitor electrode 160, the sum of a phase delay in the phase shift circuit 23A and a phase delay in the band limiting filter 24A becomes approximately 90° so as to satisfy oscillation conditions. Similarly, since the AC voltage signal MNTB is a signal of which a phase advances by 90° with respect to the AC current that is output from the stationary monitor electrode 162, the sum of a phase delay in the phase shift circuit 23B and a phase delay in the band limiting filter 24B becomes approximately 90° so as to satisfy oscillation conditions. For example, the phase delay in the phase shift circuits 23A and 23B may be 75°, and the phase delay in the band limiting filters 24A and 24B may be 15°.

As described above, the phase shift circuit 23A and the band limiting filter 24A adjust the phase of the drive signal, and constitute a phase adjustment unit 27A that limits a frequency band of the drive signal. Similarly, the phase shift circuit 23B and the band limiting filter 24B adjust the phase of the drive signal, and constitute a phase adjustment unit 27B that limits the frequency band of the drive signal. In the example illustrated in FIG. 7, the phase adjustment unit 27A and the phase adjustment unit 27B are realized by two circuits including the phase shift circuit 23A and the band limiting filter 24A, or two circuits including the phase shift circuit 23B and the band limiting filter 24B, but may be realized by one circuit (for example, a filter using an active element, an LC filter, and the like) having a function of a phase adjustment function and a band limiting function with respect to the AC voltage signal MNT or the AC voltage signal MNTB.

Output signals of the band limiting filters 24A and the band limiting filter 24B are input to the comparator 25. The comparator 25 compares the output voltage of the band limiting filter 24A (a voltage of the output signal of the phase adjustment unit 27A) and an output voltage of the band limiting filter 24B (a voltage of the output signal of the phase adjustment unit 27B), and outputs rectangular waveform signals, of which phases are inverted from each other, from a non-inverting output terminal and an inverting output terminal. In the example illustrated in FIG. 7, a rectangular waveform signal, which is output from the inverting output terminal of the comparator 25, is used as a Coriolis reference signal SDET to be described later. When the output voltage of the band limiting filter 24A is higher than the output voltage of the band limiting filter 24B, the Coriolis reference signal SDET becomes a high level. In addition, when the output voltage of the band limiting filter 24A is lower than the output voltage of the band limiting filter 24B, the Coriolis reference signal SDET becomes a low level.

The rectangular waveform signals, which are output from the comparator 25 and of which phases are inverted from each other, are input to the level conversion circuit 26. The level conversion circuit 26 converts a voltage level of the output signal of the comparator 25. Specifically, the level conversion circuit 26 converts rectangular waveform signals, which are output from the comparator 25 of which phases are inverted from each other, into rectangular waveform signals in which a high level is set to a voltage VH and a low level is set to a voltage VL. The rectangular waveform signals, which are output from the level conversion circuit 26 and of which phases are inverted from each other, are respectively input to the stationary drive electrodes 130 and 132 of the angular velocity detection element 10 as a drive signal. The angular velocity detection element 10 is driven by the drive signal that is input to the stationary drive electrodes 130 and 132.

A circuit, which is constituted by the comparator 25 and the level conversion circuit 26, functions as a drive signal generation unit that generates a drive signal for driving the angular velocity detection element 10 on the basis of the output signals from the phase adjustment units 27A and 27B.

Here, in this embodiment, in consideration of a situation in which a current output from the angular velocity detection element 10 that is an electrostatic capacitive MEMS element is very small, and thus the current is received by the Q/V converter 21A and 21B instead of an I/V converter. The current (charge), which is output from the angular velocity detection element 10, is accumulated in the capacitors 211A and 211B, and is sufficiently amplified by the operational amplifiers 210A and 210B. Accordingly, in output signals of the Q/V converters 21A and 21B, a decrease in S/N is suppressed, and thus it is possible to maintain high S/N.

In addition, in this embodiment, with regard to an oscillation frequency f0 of the oscillating body 112, an amplitude gain of the phase shift circuits 23A and 23B is 1, and an amplitude gain of the band limiting filters 24A and 24B is also 1. Accordingly, the output signals of the Q/V converters 21A and 21B are respectively output from the band limiting filters 24A and 24B in a state in which an amplitude is hardly attenuated. In addition, the band limiting filters 24A and 24B are respectively provided on a rear stage side of the phase shift circuits 23A and 23B. Accordingly, it is possible to attenuate a high-frequency noise that occurs in the phase shift circuits 23A and 23B by the band limiting filters 24A and 24B. Accordingly, even in the output signals of the band limiting filters 24A and 24B, the same high S/N as in the output signals of the Q/V converters 21A and 21B is maintained. As a result, a jitter of the drive signal is reduced, and a jitter of the Coriolis reference signal SDET or the quadrature reference signal QDET, which varies in conjunction with the drive signal, is also reduced.

The angular velocity detection circuit 30 in this embodiment includes two Q/V converters (charge amplifiers) 31A and 31B, a differential amplifier 32, a Coriolis synchronous detection circuit 33, a quadrature synchronous detection circuits 34, an amplitude adjustment circuit 35, an addition circuit 36, and an inverting amplifier circuit 37.

Detection signals (AC current), which are output from the stationary detection electrodes 140 and 142 of the angular velocity detection element 10, include a Coriolis signal that is an angular velocity component based on a Coriolis force that acts on the angular velocity detection element 10, and a quadrature signal (leakage signal) that is a self-oscillation component based on an exciting oscillation of the angular velocity detection element 10. Phases of the quadrature signal (leakage signal) and the Coriolis signal (angular velocity component), which are included in the detection signal output from the stationary detection electrode 140, deviate from each other by 90°. Similarly, phases of the quadrature signal (leakage signal) and the Coriolis signal (angular velocity component), which are included in the detection signal output from the stationary detection electrode 142, deviate from each other by 90°. In addition, with regard to the Coriolis signals (angular velocity component) and the quadrature signals (leakage signals) which are included in the detection signals output from the stationary detection electrodes 140 and 142, phases of the Coriolis signals are inverted from each other, and phases of the quadrature signals are inverted from each other.

The Q/V converter 31A (an example of a first conversion unit) converts a current (an example of a first detection signal), which is output from the stationary detection electrode 140 (an example of a first detection electrode) of the angular velocity detection element 10, into a voltage. Similarly, the Q/V converter 31B (an example of a second conversion unit) converts a current (an example of a second detection signal), which is output from the stationary detection electrode 142 (an example of a second detection electrode) of the angular velocity detection element 10, into a voltage.

Specifically, when the oscillating body 112 of the angular velocity detection element 10 oscillates, currents, which are based on a capacitance variation, are output from the stationary detection electrodes 140 and 142, and are input to the inverting input terminals of the operational amplifiers 310A and 310B of the Q/V converters 31A and 31B. The Q/V converter 31A converts an AC current, which is output from the stationary detection electrode 140, into a voltage based on an analog ground voltage AGND, and outputs the resultant signal. Similarly, the Q/V converter 31B converts a current, which is output from the stationary detection electrode 142, into a voltage based on the analog ground voltage AGND, and outputs the resultant signal. The signals, which are output from the Q/V converters 31A and 31B, are signals of which a phase advances by 90° with respect to the AC currents output from the stationary detection electrodes 140 and 142.

The AC voltage signal, which is output from the Q/V converter 31A, is input to the addition circuit 36. The addition circuit 36 is provided on a first signal path ranging from the stationary detection electrode 140 of the angular velocity detection element 10 to the differential amplifier 32, and adds an output signal of the Q/V converter 31A and an output signal of the amplitude adjustment circuit 35. The addition circuit 36 includes an operational amplifier 360, and the output signal of the Q/V converter 31A, the output signal of the amplitude adjustment circuit 35, and an output signal of the operational amplifier 360 are respectively input to an inverting input terminal of the operational amplifier 360 through a resistor. In addition, the analog ground voltage AGND is supplied to a non-inverting input terminal of the operational amplifier 360.

In addition, the AC voltage signal, which is output from the Q/V converter 31B, is input to the inverting amplifier circuit 37. The inverting amplifier circuit 37 inverting-amplifies the output signal of the Q/V converter 31B on the basis of the analog ground voltage AGND.

An AC voltage signal output from the addition circuit 36 and an AC voltage signal output from the inverting amplifier circuit 37 are input to the differential amplifier 32. The differential amplifier 32 (an example of a differential amplifier unit) differentially amplifies the output signal (an example of a signal based on an output signal of the first conversion unit) of the addition circuit 36, and the output signal (an example of a signal based on an output signal of the second conversion unit) of the inverting amplifier circuit 37, and outputs the resultant signals.

The signals, which are output from the differential amplifier 32, are input to the Coriolis synchronous detection circuit 33. The Coriolis synchronous detection circuit 33 synchronously detects the signals output from the differential amplifier 32 on the basis of the Coriolis reference signal SDET. More specifically, when the Coriolis reference signal SDET is in a high level, the Coriolis synchronous detection circuit 33 selects a signal output from the differential amplifier 32, and when the Coriolis reference signal SDET is in a low level, the Coriolis synchronous detection circuit 33 selects a signal obtained by inverting polarity of a signal output from the differential amplifier 32 to perform full-wave rectification, and outputs a signal, which is obtained by the full-wave rectification, after performing low-pass filter processing. The signal, which is output from the Coriolis synchronous detection circuit 33, is a signal obtained by extracting the Coriolis signal (angular velocity component) from the detection signals output from the stationary detection electrodes 140 and 142 of the angular velocity detection element 10, and becomes a voltage corresponding to the magnitude of the Coriolis signal (angular velocity component). The signals, which are output from the Coriolis synchronous detection circuit 33, are output to the outside of the angular velocity detection device 1 as an angular velocity signal SO. As described above, the jitter of the Coriolis reference signal SDET is reduced, and thus accuracy of the synchronous detection by the Coriolis synchronous detection circuit 33 is also improved. As a result, detection accuracy of the angular velocity is improved.

A circuit, which is constituted by the differential amplifier 32 and the Coriolis synchronous detection circuit 33, functions as an angular velocity signal generation unit that differentially amplifies the output signals of the Q/V converter 31A and the Q/V converter 31B by the differential amplifier 32, and generates the angular velocity signal SO on the basis of the output signal of the differential amplifier 32.

The signal, which is output from the differential amplifier 32, is also input to the quadrature synchronous detection circuits 34. The quadrature synchronous detection circuits 34 (an example of a synchronous detection circuit) detects a level of a quadrature signal (leakage signal) that is included in AC currents which are respectively output from the stationary detection electrode 140 and the stationary detection electrode 142 of the angular velocity detection element 10 on the basis of the output signal (AC voltage signal) of the differential amplifier 32.

Specifically, the quadrature synchronous detection circuits 34 synchronously detects the output signal (AC voltage signal) of the differential amplifier 32 on the basis of the quadrature reference signal QDET to detect a level of the quadrature signal (leakage signal). That is, when the quadrature reference signal QDET is in a high level, the quadrature synchronous detection circuits 34 selects the AC voltage signal output from the differential amplifier 32, and when the quadrature reference signal QDET is in a low level, the quadrature synchronous detection circuits 34 selects a signal obtained by inverting polarity of the AC voltage signal output from the differential amplifier 32 to perform full-wave rectification, and outputs a signal, which is obtained by the full-wave rectification, after performing integration processing. The signal, which is output from the quadrature synchronous detection circuits 34, is a signal obtained by extracting the quadrature signal (leakage signal) from the detection signals output from the stationary detection electrodes 140 and 142 of the angular velocity detection element 10, and becomes a voltage corresponding to the magnitude of the quadrature signal (leakage signal).

The signal, which is output from the quadrature synchronous detection circuits 34, is input to the amplitude adjustment circuit 35. The amplitude adjustment circuit 35 outputs a signal obtained by adjusting an amplitude of the AC voltage signal MNT so as to cancel the quadrature signal (leakage signal) that is input to the Q/V converters 31A and 31B in correspondence with the output signal of the quadrature synchronous detection circuit 34. The signal, which is output from the amplitude adjustment circuit 35, is an AC voltage signal that has the same frequency as an oscillation frequency (frequency of the quadrature signal (leakage signal)) and has an amplitude that is determined in accordance with the magnitude of the quadrature signal (leakage signal). In addition, the AC voltage signal, which is output from the amplitude adjustment circuit 35, is input to a circuit that is located on the first signal path ranging from the stationary detection electrode 140 of the angular velocity detection element 10 to the differential amplifier 32. In addition, the output signal of the amplitude adjustment circuit 35 is not input to a circuit that is located on a second signal path ranging from the stationary detection electrode 142 of the angular velocity detection element 10 to the differential amplifier 32. Particularly, in this embodiment, the output signal of the amplitude adjustment circuit 35 is input to the addition circuit 36 that is a circuit on a rear stage side of the Q/V converter 31A in the first signal path. More specifically, the output signal of the amplitude adjustment circuit 35 is input to the inverting input terminal of the operational amplifier 360 of the addition circuit 36 through a resistor.

The AC voltage signal, which is input to the inverting input terminal of the operational amplifier 360, acts to remove the quadrature signal (leakage signal) included in currents which are respectively input from the stationary detection electrodes 140 and 142 of the angular velocity detection element 10 to the inverting input terminals of the operational amplifiers 310A and 310B. Accordingly, in the output signal of the differential amplifier 32, the quadrature signal (leakage signal) is greatly attenuated. As a result, it is possible to reduce an offset of the angular velocity signal SO that occurs due to the quadrature signal (leakage signal). In addition, as described above, in this embodiment, the jitter of the quadrature reference signal QDET is reduced, and thus accuracy of the synchronous detection by the quadrature synchronous detection circuits 34A and 34B is improved. As a result, it is possible to further improve S/N of the angular velocity signal SO in comparison to the related art. Hereinafter, a signal, which is input to the inverting input terminal of the operational amplifier 360, is referred to as "quadrature correction signal".

As described above, a circuit, which is constituted by the quadrature synchronous detection circuits 34 and the amplitude adjustment circuit 35, functions as a correction signal generation unit that generates a quadrature correction signal (an example of a correction signal) for reducing an offset of the angular velocity signal SO, which occurs due to the quadrature signal (leakage signal) included in the AC currents which are respectively output from the stationary detection electrode 140 and the stationary detection electrode 142 of the angular velocity detection element 10, on the basis of the AC voltage signal MNT that is a signal based on the drive oscillation of the angular velocity detection element 10. In addition, the amplitude adjustment circuit 35 functions as an amplitude adjustment unit that adjusts an amplitude of the quadrature correction signal on the basis of the level of the quadrature signal (leakage signal) which is detected by the quadrature synchronous detection circuits 34.

Figure 8:
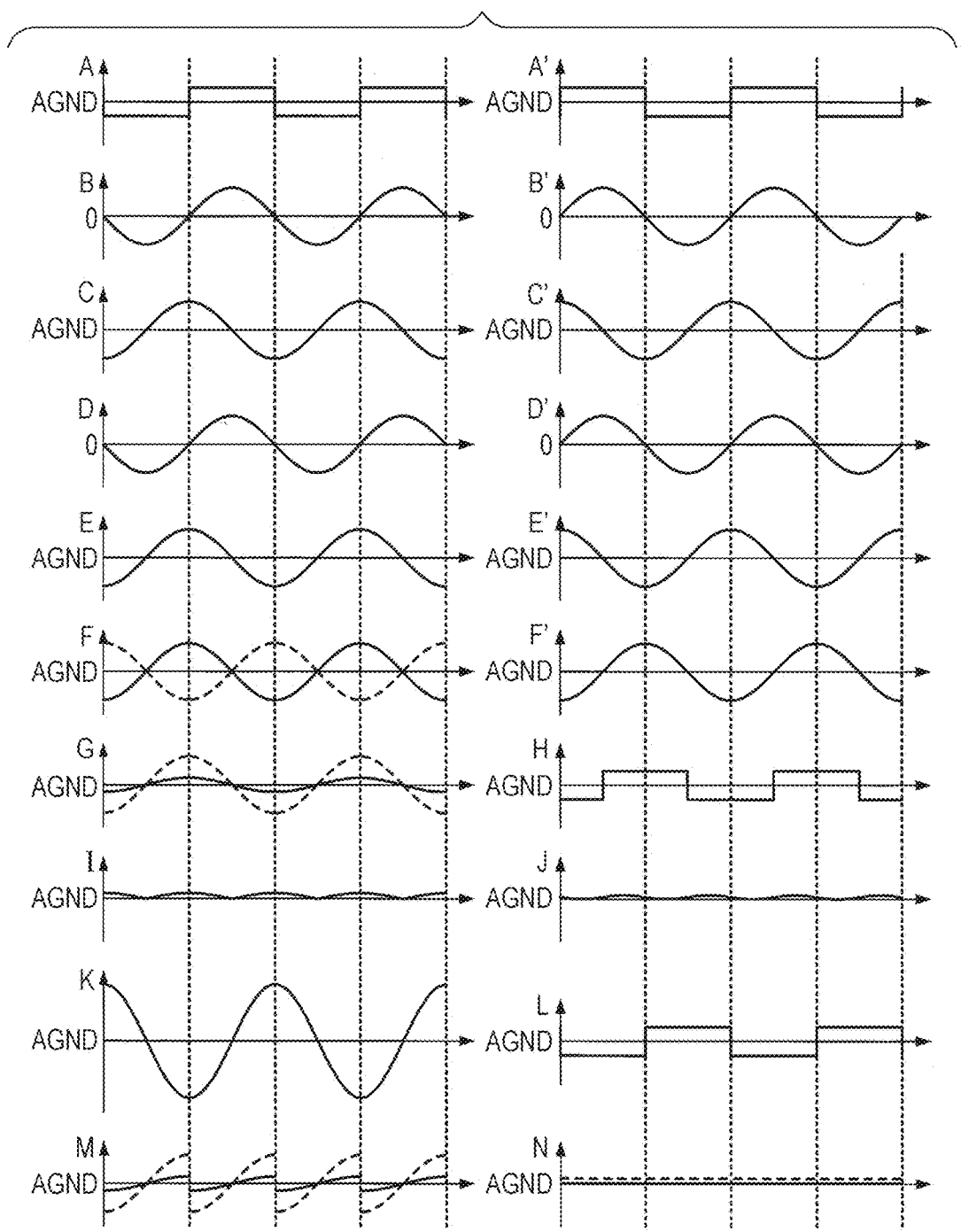
FIG. 8 is a view illustrating an example of a signal waveform in the angular velocity detection device according to the first embodiment.

Next, description will be given of the principle of removing the quadrature signal (leakage signal) by the angular velocity detection device 1 illustrated in FIG. 7 with reference to a waveform diagram in FIG. 8. FIG. 8 is a view illustrating an example of a signal waveform at a point A to a point M in FIG. 7. In FIG. 8, the horizontal axis represents time, and the vertical axis represents a voltage or a current. FIG. 8 illustrates an example in a case where the Coriolis force is not applied to the angular velocity detection element 10, but the same description can be made even in a case where the Coriolis force is applied.

In a state in which the oscillating body 112 of the angular velocity detection element 10 oscillates, drive signal (signals at the point A and the point A'), which are output from the level conversion circuit 26, are rectangular waves of which phases are inverted from each other. In addition, phases of the AC currents (signals at the point B and the point B'), which are input to the Q/V converters 21A and 21B are inverted from each other, and phases of the AC voltage signals MNT and MNTB (signals at the point C and the point C'), which are output from the Q/V converters 21A and 21B, are inverted from each other. The phases of the AC voltage signals MNT and MNTB (signals at the point C and the point C') advance by 90° with respect to the AC currents (signals at the point B and the point B') which are respectively input to the Q/V converters 21A and 21B.

Since the Coriolis force is not applied to the angular velocity detection element 10, and thus the detection signals (signals at the point D and the point D'), which are input to the Q/V converters 31A and 31B, do not include the Coriolis signal and include only the quadrature signal (leakage signal). Phases of the quadrature signals (leakage signals) (signals at the point D and the point D'), which are input to the Q/V converters 31A and 31B, are inverted from each other, and the quadrature signals have the same phases as those of the AC currents (signals at the point B and the point B') which are respectively input to the Q/V converters 21A and 21B. Phases of the AC voltage signals (signals at the points E and E'), which are output from the Q/V converters 31A and 31B, are inverted from each other, advance by 90° with respect to the AC currents (signals at the point D and D') which are respectively input to the Q/V converters 31A and 31B, and are the same as phases of the AC voltage signals MNT and MNTB (signals at the point C and C').

The quadrature correction signal (signal at the point K), which is input to the addition circuit 36, has a waveform in which an amplitude of the AC voltage signal MNT (signal at the point C) is adjusted by the amplitude adjustment circuit 35 in correspondence with a waveform of the output signal (signal at the point J) of the quadrature synchronous detection circuit 34.

The quadrature correction signal (signal at the point K) has the same phase as that of the AC voltage signal (signal at the point E) that is output from the Q/V converter 31A, and this signal is added in the addition circuit 36. The output signal (signal at the point F) of the addition circuit 36 has a waveform (solid-line waveform) obtained by adding a waveform of the quadrature correction signal (signal at the point K) and a waveform of the output signal (signal at the point E) of the Q/V converter 31A.

The output signal (signal at the point F') of the inverting amplifier circuit 37 has a waveform in which the voltage of the output signal (signal at the point E') of the Q/V converter 31B is inverted on the basis of the analog ground voltage AGND. The inverting amplifier circuit 37 is set in such a manner that a gain and a phase delay become the same with respect to the addition circuit 36.

Here, an amplitude and a phase of the output signal (signal (solid line) at the point F) of the addition circuit 36 are approximately the same as those of the output signal (signal at the point F') of the inverting amplifier circuit 37. That is, the amplitude adjustment circuit 35 inverts the voltage of the AC voltage signal MNT (signal at the point C) on the basis of the analog ground voltage AGND, and adjusts an amplitude of the AC voltage signal MNT (signal at the point C) in correspondence with the output signal (signal at the point J) of the quadrature synchronous detection circuits 34 so that the output signal (signal (solid-line waveform) at the point F) of the addition circuit 36 has approximately the same amplitude and phase with respect to the output signal (signal at the point F') of the inverting amplifier circuit 37, thereby generating the quadrature correction signal (signal at the point K).

The output signal (signal at the point F) of the addition circuit 36 and the output signal (signal at the point F') of the inverting amplifier circuit 37 are differentially amplified in the differential amplifier 32, and the output signal (signal at the point G) of the differential amplifier 32 has a waveform (solid-line waveform) in which the amplitude of the quadrature signal (leakage signal) is attenuated.

In the quadrature synchronous detection circuits 34, a signal (signal at the point I), which is obtained through the full-wave rectification of the output signal (signal (solid-line waveform) at the point G) of the differential amplifier 32 in accordance with the quadrature reference signal QDET (signal at the point H), has a positive-polarity waveform in which an amplitude is small. Accordingly, an integration signal (signal at the point J) of the full-wave rectified signal (signal at the point I) has a low level and a positive-polarity voltage waveform that is close to DC. In addition, for example, the amplitude of the quadrature correction signal (signal at the point K), which is input to the addition circuit 36, is adjusted by the amplitude adjustment circuit 35 so that the level of the output signal (signal at the point J) of the quadrature synchronous detection circuits 34 becomes the minimum. According to this, feedback is performed so that the amplitude of the output signal (signal at the point G) of the differential amplifier 32 is attenuated.

As a result, in the Coriolis synchronous detection circuit 33, a signal (signal at the point M) obtained through the full-wave rectification of the output signal (signal at the point G) of the differential amplifier 32 in accordance with the Coriolis reference signal SDET (signal at the point L) has a waveform (solid-line waveform) in which the positive polarity and the negative polarity repeat and an amplitude is small. Accordingly, the angular velocity signal SO (signal at the point N), which is a signal obtained by subjecting the full-wave rectified signal (signal at the point M) to the low-pass filtering processing, becomes a voltage (solid-line waveform) that is approximately the same as the analog ground voltage AGND even though symmetry between the positive-polarity waveform and the negative-polarity waveform in the full-wave rectified signal (signal at the point M) slightly deviates. That is, the offset of the angular velocity signal SO, which occurs due to the quadrature signal (leakage signal), is very small.

Furthermore, in a case where the quadrature correction signal (signal at the point K) is not supplied to the inverting input terminal of the operational amplifier 360 through a resistor, respective signals at the point F, the point G, the point M, and the point N have the same waveform as the broken lines in FIG. 8, and the angular velocity signal SO (signal at the point N) becomes a voltage that deviates from the analog ground voltage AGND in correspondence with a deviation in symmetry between the positive-polarity waveform and the negative-polarity waveform in the full-wave rectified signal (signal at the point M). That is, the offset of the angular velocity signal SO, which occurs due to the quadrature signal (leakage signal), is great.

Operation Effect

As described above, according to the angular velocity detection device 1 (angular velocity detection circuit 30) according to the first embodiment, the quadrature correction signal, of which an amplitude is adjusted by the amplitude adjustment circuit 35, is input to the addition circuit 36 that is located on the first signal path ranging from the stationary detection electrode 140 of the angular velocity detection element 10 to the differential amplifier 32. According to this, it is possible to reduce the offset of the angular velocity signal SO which occurs due to the quadrature signal (leakage signal) included in the detection signals which are output from the stationary detection electrodes 140 and 142 of the angular velocity detection element 10. Accordingly, according to the angular velocity detection device 1 (angular velocity detection circuit 30) according to the first embodiment, the ratio of the angular velocity component (Coriolis signal) and the noise component, which are included in the output signal of the differential amplifier 32, increases. As a result, it is possible to further improve S/N of the angular velocity signal SO that is generated on the basis of the output signal of the differential amplifier 32.

In addition, according to the angular velocity detection device 1 (angular velocity detection circuit 30) according to the first embodiment, it is not necessary to provide an addition circuit, to which the quadrature correction signal is input, on a second signal path ranging from the stationary detection electrode 142 of the angular velocity detection element 10 to the differential amplifier 32, and thus it is possible to reduce a circuit area.

In addition, according to the angular velocity detection device 1 (angular velocity detection circuit 30) according to the first embodiment, even when the amplitude of the quadrature signal (leakage signal), which is included in the detection signals output from the stationary detection electrodes 140 and 142 of the angular velocity detection element 10, varies, the amplitude of the quadrature correction signal is adjusted in conformity to the variation. Accordingly, even when an environment varies, it is possible to constantly maintain S/N of the angular velocity signal SO.

In addition, according to the angular velocity detection device 1 (angular velocity detection circuit 30) according to the first embodiment, the level of the quadrature signal (leakage signal) is collectively detected by one quadrature synchronous detection circuit 34 on the basis of the output signal of the differential amplifier 32, and thus it is possible to reduce a circuit area.

In addition, according to the angular velocity detection device 1 (angular velocity detection circuit 30) according to the first embodiment, in a manufacturing process thereof, it is not necessary to inspect the amplitude of the quadrature signal (leakage signal) that is included in the detection signals output from the stationary detection electrodes 140 and 142 of the angular velocity detection element 10 so as to set information for adjusting the amplitude of the quadrature correction signal. As a result, it is also possible to reduce the manufacturing cost.

1-2. Second Embodiment

Figure 9:
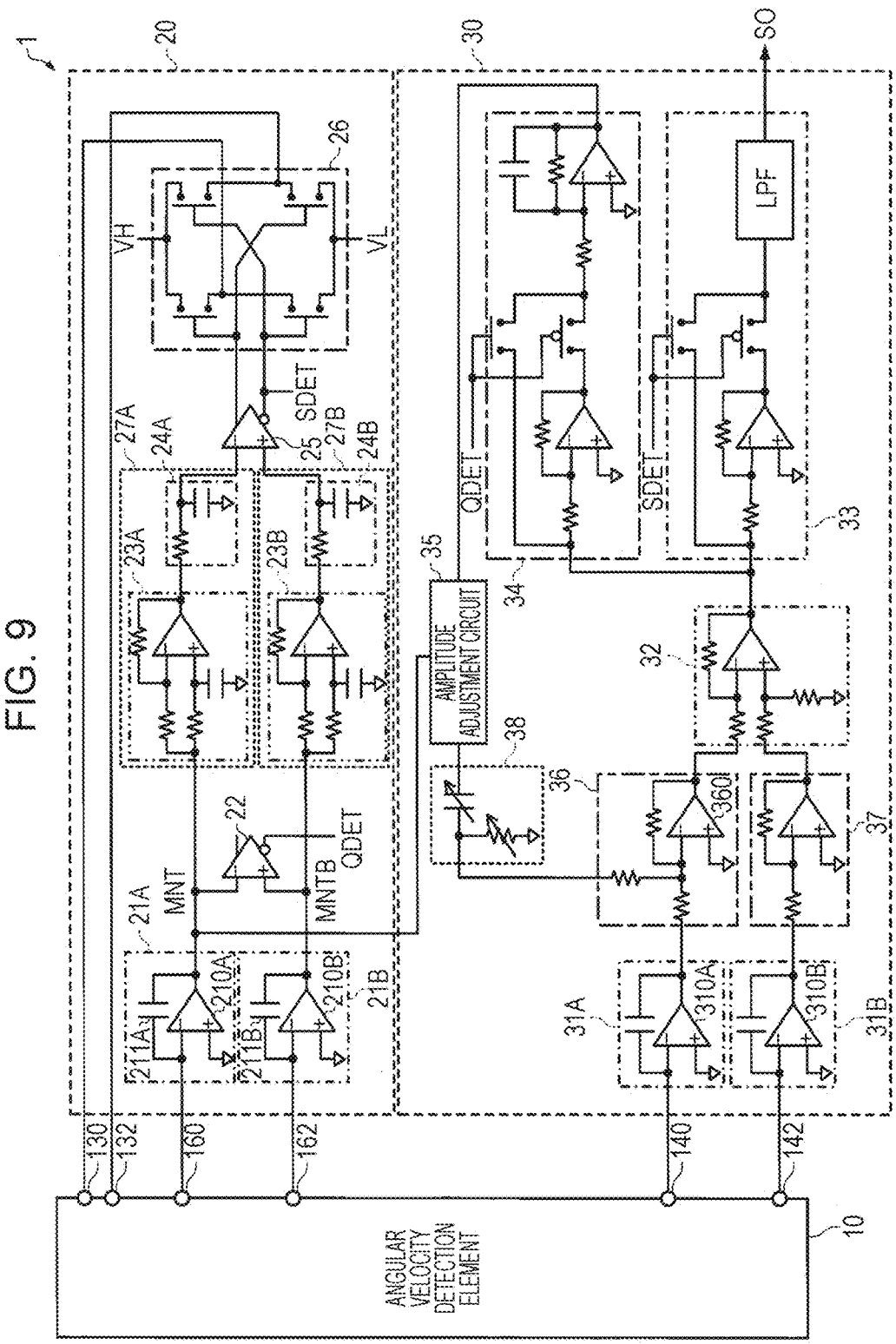
FIG. 9 is a view illustrating a configuration of an angular velocity detection device according to a second embodiment.

FIG. 9 is a view illustrating a configuration of an angular velocity detection device 1 according to a second embodiment. In FIG. 9, the same reference numeral is given to the same constituent element as in FIG. 7. Hereinafter, with regard to the angular velocity detection device 1 according to the second embodiment, description redundant with the first embodiment will be omitted, and description will be made with focus given to contents different from the first embodiment.

In the first embodiment, a phase difference between the signal output from the amplitude adjustment circuit 35 and the signal output from the operational amplifier 310A may deviate from 0° due to the phase delay in the amplitude adjustment circuit 35. Accordingly, as illustrated in FIG. 9, in the angular velocity detection device 1 according to the second embodiment, with regard to the first embodiment (FIG. 7), a phase adjustment circuit 38 is further added. The phase adjustment circuit 38 (an example of a phase adjustment unit) is a circuit that adjust the phase of the quadrature correction signal (an example of a correction signal) that is input to the addition circuit 36 (inverting input terminal of the operational amplifier 360). Specifically, the phase adjustment circuit 38 adjusts the phase of the quadrature correction signal, which is input to the inverting input terminal of the operational amplifier 360 through a resistor, so as to cancel the quadrature signal (leakage signal) input to the Q/V converters 31A and 31B on the basis of the level of the leakage signal which is detected by the quadrature synchronous detection circuits 34. For example, the amount of phase advance in the phase adjustment circuit 38 may be changed in order for the quadrature signal (leakage signal) input to the Q/V converters 31A and 31B to be cancelled by changing at least one of a resistance value of a variable resistor and a capacitance value of a variable capacitor in the phase adjustment circuit 38 in correspondence with a level of an output signal of the quadrature synchronous detection circuits 34.

For example, the phase of the quadrature correction signal, which is input to the addition circuit 36, is adjusted by the phase adjustment circuit 38 so that the level of the output signal of the quadrature synchronous detection circuit 34 becomes the minimum. According to this, feedback is performed so that the amplitude of the quadrature signal (leakage signal) included in the output signal of the differential amplifier 32 is attenuated. As a result, it is possible to reduce an offset of the angular velocity signal SO which occur due to the quadrature signal (leakage signal).

As described above, a circuit, which is constituted by the quadrature synchronous detection circuits 34, the amplitude adjustment circuit 35, and the phase adjustment circuit 38, functions as a correction signal generation unit that generates the quadrature correction signal (an example of a correction signal) for reducing the offset of the angular velocity signal SO that occurs due to the quadrature signal (leakage signal) included in the AC currents which are output from the stationary detection electrodes 140 and 142 of the angular velocity detection element 10 on the basis of the AC voltage signal MNT that is a signal based on the drive oscillation of the angular velocity detection element 10.

The other configurations in the angular velocity detection device 1 according to the second embodiment are also the same as those in the first embodiment (FIG. 7).

According to the above-described angular velocity detection device 1 (angular velocity detection circuit 30) according to the second embodiment, as is the case with the angular velocity detection device 1 (angular velocity detection circuit 30) according to the first embodiment, the offset of the angular velocity signal SO, which occurs due to the quadrature signal (leakage signal) included in the detection signals which are output from the stationary detection electrodes 140 and 142 of the angular velocity detection element 10, is reduced, and the ratio of the angular velocity component (Coriolis signal) and the noise component which are included in the output signal of the differential amplifier 32 increases. As a result, it is possible to further improve S/N of the angular velocity signal SO that is generated on the basis of the output signal of the differential amplifier 32. In addition, as is the case with the angular velocity detection device 1 (angular velocity detection circuit 30) according to the first embodiment, it is not necessary to provide an addition circuit, to which the quadrature correction signal is input, on a second signal path ranging from the stationary detection electrode 142 of the angular velocity detection element 10 to the differential amplifier 32, and the level of the quadrature signal (leakage signal) is collectively detected by one quadrature synchronous detection circuit 34, and thus it is possible to reduce a circuit area.

In addition, according to the angular velocity detection device 1 (angular velocity detection circuit 30) according to the second embodiment, even when the amplitude or the phase of the quadrature signal (leakage signal), which is included in the detection signals output from the stationary detection electrodes 140 and 142 of the angular velocity detection element 10, varies, the amplitude or the phase of the quadrature correction signal is automatically adjusted in conformity to the variation. Accordingly, even when an environment varies, it is possible to constantly maintain S/N of the angular velocity signal SO.

In addition, according to the angular velocity detection device 1 (angular velocity detection circuit 30) according to the second embodiment, in a manufacturing process thereof, it is not necessary to inspect the amplitude or the phase of the quadrature signal (leakage signal) that is included in the detection signals output from the stationary detection electrodes 140 and 142 of the angular velocity detection element 10 so as to set information for adjusting the amplitude or the phase of the quadrature correction signal. As a result, it is also possible to reduce the manufacturing cost.

Furthermore, in the example illustrated in FIG. 9, the phase adjustment circuit 38 is provided between an output terminal of the amplitude adjustment circuit 35 and an input terminal of the addition circuit 36, but may be provided between an output terminal of the Q/V converter 21A and an input terminal of the amplitude adjustment circuit 35.

1-3. Third Embodiment

Figure 10:
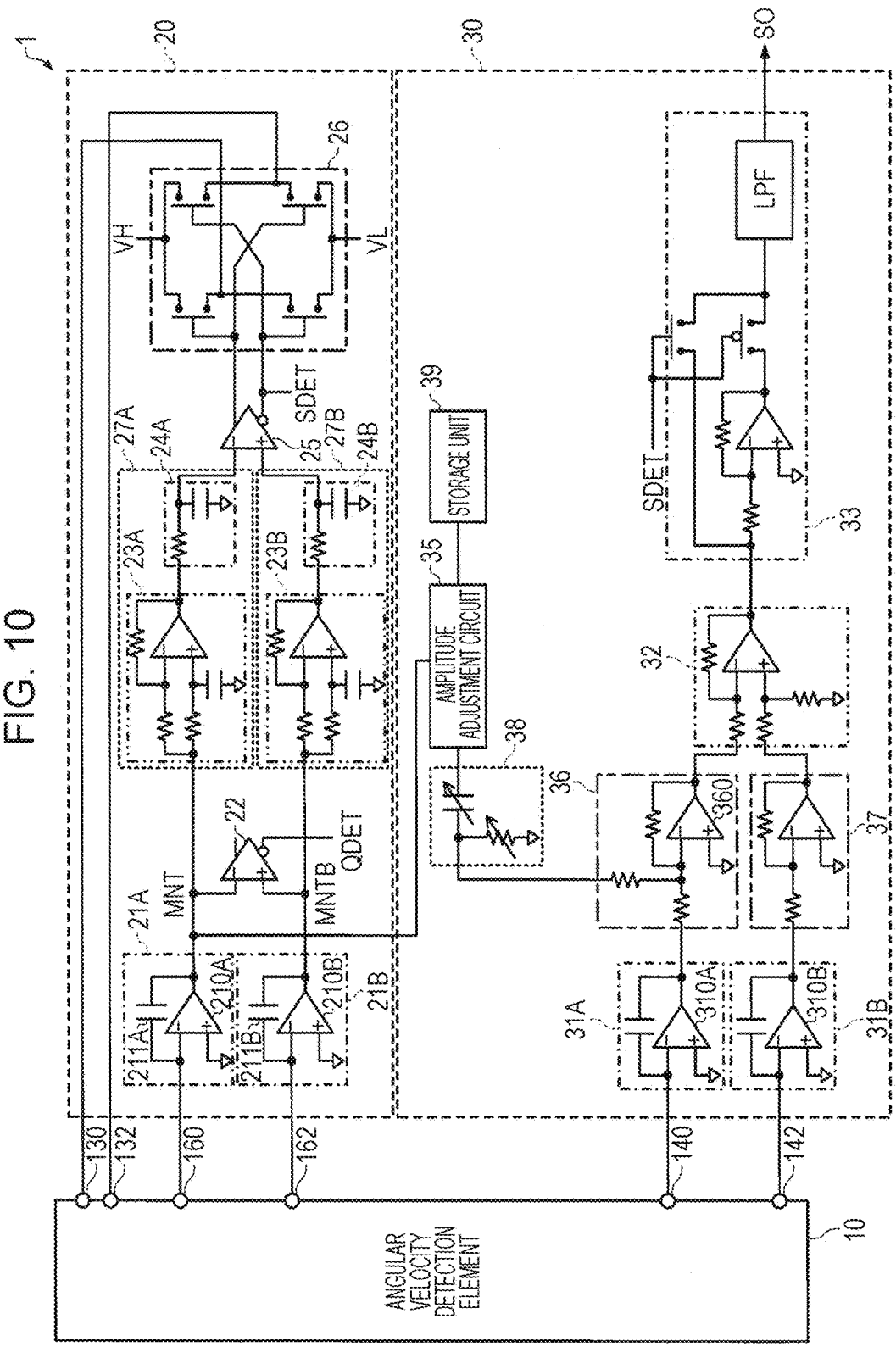
FIG. 10 is a view illustrating a configuration of an angular velocity detection device according to a third embodiment.

FIG. 10 is a view illustrating a configuration of an angular velocity detection device 1 according to a third embodiment. In FIG. 10, the same reference numeral is given to the same constituent element as in FIG. 9. Hereinafter, with regard to the angular velocity detection device 1 according to the third embodiment, description redundant with the first embodiment or the second embodiment will be omitted, and description will be made with focus given to contents different from the first embodiment and the second embodiment.

As illustrated in FIG. 10, in the angular velocity detection device 1 according to the third embodiment, with regard to the second embodiment, a storage unit 39 is provided instead of the quadrature synchronous detection circuits 34. In addition, the amplitude adjustment circuit 35 adjusts an amplitude of the quadrature correction signal that is input to the addition circuit 36 on the basis of information (amplitude adjustment information) that is stored in the storage unit 39. In addition, the phase adjustment circuit 38 adjusts a phase of the quadrature correction signal that is input to the addition circuit 36 on the basis of the information (phase adjustment information) that is stored in the storage unit 39.

For example, the amplitude adjustment information stored in the storage unit 39 may be an integer value, and the amplitude adjustment circuit 35 may output a signal obtained by multiplying the amplitude of the AC voltage signal MNT by the constant. In addition, the phase adjustment information stored in the storage unit 39 may be an integer value, and the phase adjustment circuit 38 may output a quadrature correction signal of which a phase advances with respect to the output signal of the amplitude adjustment circuit 35 by changing at least one of a resistance value of a variable resistor and a capacitance value of a variable capacitor in correspondence with the integer value.

For example, in a process of inspecting the angular velocity detection device 1, the level of the quadrature signals (leakage signals), which are respectively output from the Q/V converters 31A and 31B, may be measured, and amplitude adjustment information corresponding to the resultant measurement value may be stored in a non-volatile storage unit 39. In addition, in the process of inspecting the angular velocity detection device 1, a phase difference between the quadrature signals (leakage signals) which are respectively output from the Q/V converters 31A and 31B and the AC voltage signal MNT, may be measured, and phase adjustment information corresponding to the resultant measurement value may be stored in the non-volatile storage units 39.

The other configurations of the angular velocity detection device 1 according to the third embodiment are the same as in the second embodiment (FIG. 9).

According to the angular velocity detection device (angular velocity detection circuit 30) according to the third embodiment, as is the case with the angular velocity detection device 1 (angular velocity detection circuit 30) according to the first embodiment, the offset of the angular velocity signal SO, which occurs due to the quadrature signal (leakage signal) included in the detection signals which are output from the stationary detection electrodes 140 and 142 of the angular velocity detection element 10, is reduced, and the ratio of the angular velocity component (Coriolis signal) and the noise component which are included in the output signal of the differential amplifier 32 increases. As a result, it is possible to further improve S/N of the angular velocity signal SO that is generated on the basis of the output signal of the differential amplifier 32. In addition, as is the case with the angular velocity detection device 1 (angular velocity detection circuit 30) according to the first embodiment, it is not necessary to provide an addition circuit, to which the quadrature correction signal is input, on a second signal path ranging from the stationary detection electrode 142 of the angular velocity detection element 10 to the differential amplifier 32, and the level of the quadrature signal (leakage signal) is collectively detected by one quadrature synchronous detection circuit 34, and thus it is possible to reduce a circuit area.

In addition, according to the angular velocity detection device 1 (angular velocity detection circuit 30) according to the third embodiment, for example, in a manufacturing process thereof, the amplitude and the phase of the quadrature signal (leakage signal) that is included in the detection signals output from the stationary detection electrodes 140 and 142 of the angular velocity detection element 10 are inspected, and a plurality of pieces of information which correspond to the amplitude and the phase of the quadrature signal (leakage signal) are stored in the storage unit 39. According to this, it is possible to improve S/N of the angular velocity signal SO.

In addition, according to the angular velocity detection device 1 (angular velocity detection circuit 30) according to the third embodiment, when the amplitude or the phase of the quadrature signal (leakage signal), which is included in the detection signals output from the stationary detection electrodes 140 and 142 of the angular velocity detection element 10, varies due to an environmental variation, the amplitude or the phase of the AC voltage signal MNT also varies in the same manner. Accordingly, even when the level of the quadrature signal (leakage signal) is not detected, it is possible to constantly maintain S/N of the angular velocity signal SO to a certain extent. Accordingly, according to the angular velocity detection device 1 (angular velocity detection circuit 30) according to the third embodiment, the quadrature synchronous detection circuit 34, which detects the level of the quadrature signal (leakage signal) that is included in the detection signals output from the stationary detection electrodes 140 and 142 of the angular velocity detection element 10, become unnecessary, and thus it is also possible to reduce a circuit area.

Furthermore, in the example illustrated in FIG. 10, the phase adjustment circuit 38 is provided between the output terminal of the amplitude adjustment circuit 35 and the input terminal of the addition circuit 36, but may be provided between the output terminal of the Q/V converter 21A and the input terminal of the amplitude adjustment circuit 35. In addition, with regard to the angular velocity detection device 1 (FIG. 7) according to the first embodiment, the storage unit 39 may also be provided instead of the quadrature synchronous detection circuits 34.

1-4. Fourth Embodiment

Figure 11:
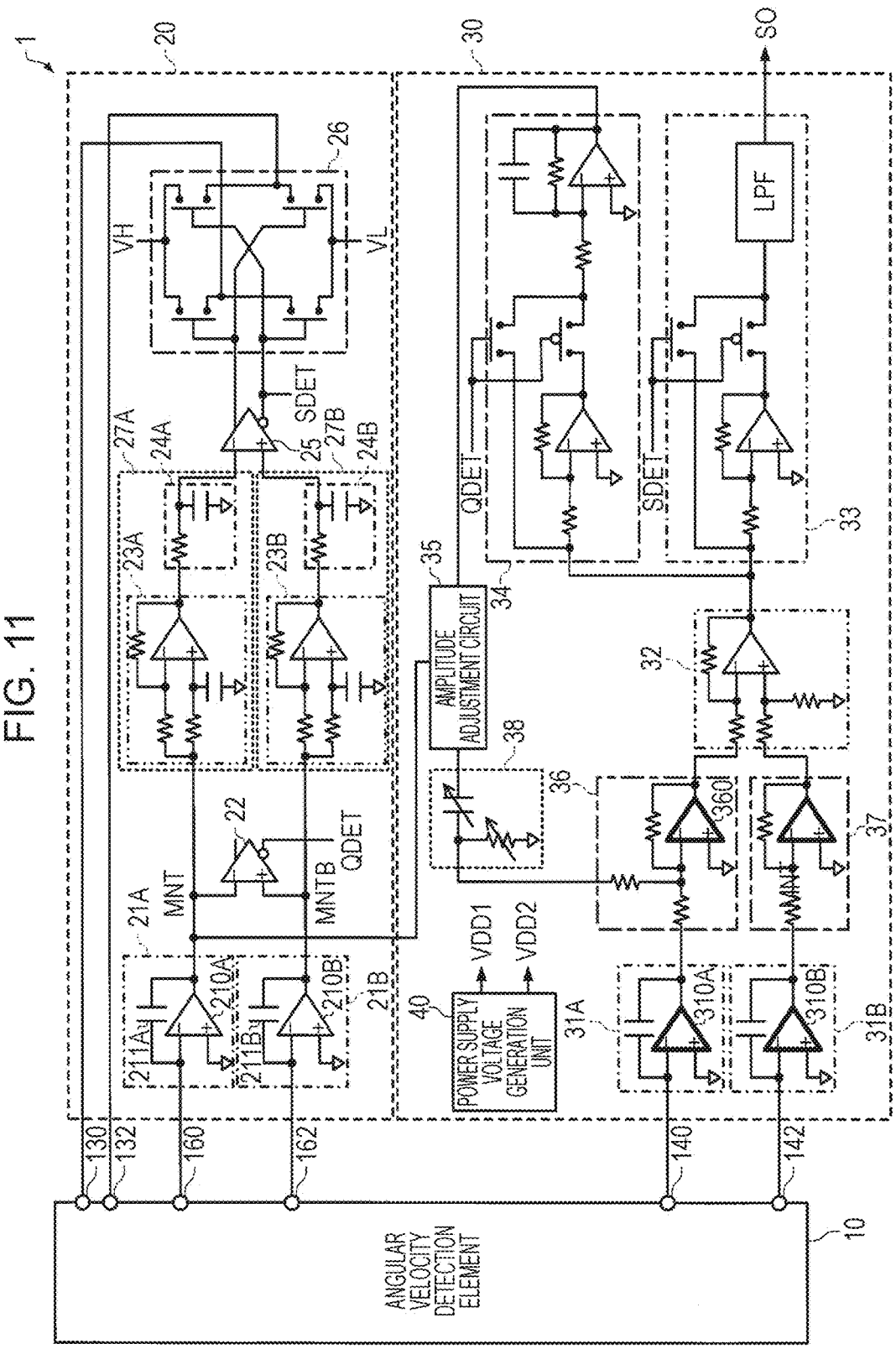
FIG. 11 is a view illustrating a configuration of an angular velocity detection device according to a fourth embodiment.

FIG. 11 is a view illustrating a configuration of an angular velocity detection device 1 according to a fourth embodiment. In FIG. 11, the same reference numeral is given to the same constituent element as in FIG. 9. Hereinafter, with regard to the angular velocity detection device 1 according to the fourth embodiment, description redundant with the first embodiment or the second embodiment will be omitted, and description will be made with focus given to contents different from the first embodiment and the second embodiment.

In the second embodiment, the Coriolis signal and the quadrature signal (leakage signal) are included in the output signals of the Q/V converters 31A and 31B, and thus when the gain of the Q/V converters 31A and 31B is enlarged, there is a concern that the output signals of the Q/V converters 31A and 31B may be saturated. Accordingly, as illustrated in FIG. 11, in the angular velocity detection device 1 according to the fourth embodiment, with regard to the second embodiment (FIG. 9), a power supply voltage VDD2 higher than a power supply voltage VDD1 of the differential amplifier 32 is supplied to the Q/V converters 31A and 31B. According to this, a voltage range of the output signals of the Q/V converters 31A and 31B becomes 0 V to VDD2, and thus the power supply voltage VDD2 is also supplied to the addition circuit 36 or the inverting amplifier circuit 37 on a rear stage side. In a normal state, the quadrature signal (leakage signal) is mostly canceled in the output signal of the differential amplifier 32, and thus the same power supply voltage VDD1 as in the second embodiment is supplied to the differential amplifier 32, and the Coriolis synchronous detection circuit 33, the quadrature synchronous detection circuits 34, the amplitude adjustment circuit 35, and the phase adjustment circuit 38 on a rear state side of the differential amplifier 32. In addition, the same power supply voltage VDD1 as in the second embodiment may also be supplied to the drive circuit 20.

As illustrated in FIG. 11, in the angular velocity detection device 1 according to the fourth embodiment, with regard to the second embodiment (FIG. 9), a power supply voltage generation unit 40 is further added. In FIG. 11, the power supply voltage generation unit 40 is provided to the angular velocity detection circuit 30, but may be provided to the drive circuit 20 or the outside of the drive circuit 20 or the angular velocity detection circuit 30. The power supply voltage generation unit 40 generates the power supply voltages VDD1 and VDD2 on the basis of a power supply voltage that is supplied from the outside of the angular velocity detection device 1. For example, the power supply voltage generation unit 40 may output the power supply voltage, which is supplied from the outside of the angular velocity detection device 1, as the power supply voltage VDD1, and may generate the power supply voltage VDD2 by raising the power supply voltage VDD1. Furthermore, for example, the power supply voltage generation unit 40 may output the power supply voltage, which is supplied from the outside of the angular velocity detection device 1, as the power supply voltage VDD2, and may generate the power supply voltage VDD1 by dividing the power supply voltage VDD2. Furthermore, the power supply voltages VDD1 and VDD2 may be supplied from the outside of the angular velocity detection device 1 of the angular velocity detection device 1 in combination with each other, and in this case, the power supply voltage generation unit 40 may not be provided.

Furthermore, in FIG. 11, an operational amplifier, to which VDD2 is supplied, is indicated by a bold line. The other configurations of the angular velocity detection device 1 according to the fourth embodiment are the same as in the second embodiment (FIG. 9).

According to the above-described angular velocity detection device 1 (angular velocity detection circuit 30) according to the fourth embodiment, as is the case with the angular velocity detection device 1 (angular velocity detection circuit 30) according to the second embodiment, the offset of the angular velocity signal SO, which occurs due to the quadrature signal (leakage signal) included in the detection signals which are output from the stationary detection electrodes 140 and 142 of the angular velocity detection element 10, is reduced, and the ratio of the angular velocity component (Coriolis signal) and the noise component which are included in the output signal of the differential amplifier 32 increases. As a result, it is possible to further improve S/N of the angular velocity signal SO that is generated on the basis of the output signal of the differential amplifier 32. In addition, as is the case with the angular velocity detection device 1 (angular velocity detection circuit 30) according to the second embodiment, it is not necessary to provide an addition circuit, to which the quadrature correction signal is input, on a second signal path ranging from the stationary detection electrode 142 of the angular velocity detection element 10 to the differential amplifier 32, and the level of the quadrature signal (leakage signal) is collectively detected by one quadrature synchronous detection circuit 34, and thus it is possible to reduce a circuit area.

In addition, according to the angular velocity detection device 1 (angular velocity detection circuit 30) according to the fourth embodiment, the power supply voltage VDD2 of the Q/V converters 31A and 31B is higher than the power supply voltage VDD1 of the differential amplifier 32, and thus it is possible to enlarge the gain of the Q/V converters 31A and 31B. That is, the Coriolis signal and the quadrature signal (leakage signal) are relatively greatly amplified due to the Q/V converters 31A and 31B, but the quadrature signal (leakage signal) is greatly attenuated due to the quadrature correction signal. As a result, it is possible to further improve S/N of the angular velocity signal SO.

Furthermore, in the example illustrated in FIG. 11, the phase adjustment circuit 38 is provided between the output terminal of the amplitude adjustment circuit 35 and the input terminal of the addition circuit 36, but may be provided between the output terminal of the Q/V converter 21A and the input terminal of the amplitude adjustment circuit 35. In addition, with regard to the angular velocity detection device 1 (FIG. 7 or FIG. 10) according to the first embodiment or the third embodiment, the power supply voltage VDD2 higher than the power supply voltage VDD1 of the differential amplifier 32 may also be supplied to the Q/V converters 31A and 31B, the addition circuit 36, and the inverting amplifier circuit 37.

2. Modification Examples 2-1. Modification Example 1

In the above-described embodiments, the quadrature correction signal is input to the inverting input terminal of the operational amplifier 360, but a modification can be made in such a manner that the quadrature correction signal is input to the inverting input terminals of the operational amplifiers 310A and 310B through a resistor.

Figure 12:
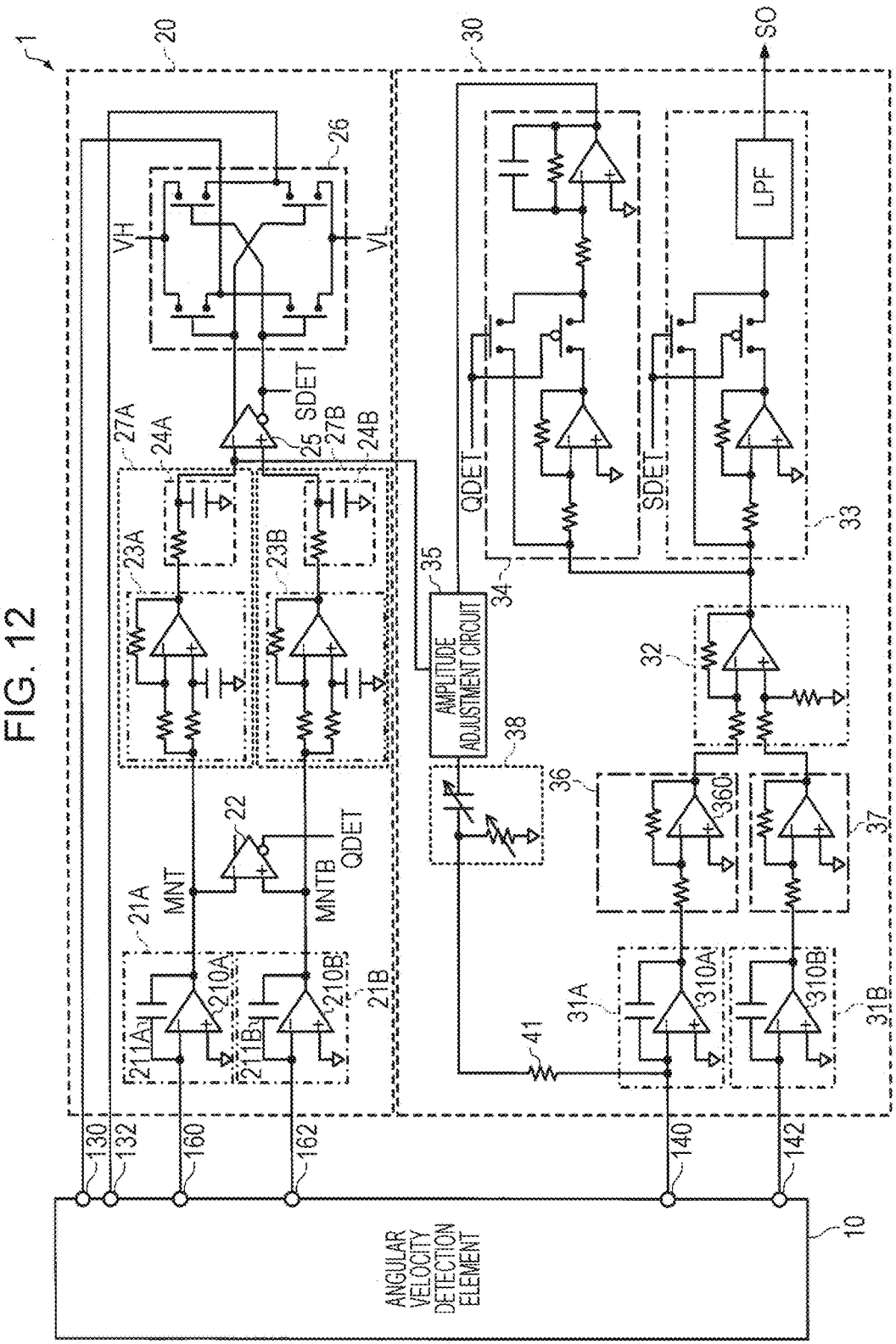
FIG. 12 is a view illustrating a configuration of an angular velocity detection device according to Modification Example 1.

FIG. 12 illustrates a configuration of an angular velocity detection device 1 according to Modification Example 1 with respect to the angular velocity detection device 1 (FIG. 9) according to the second embodiment as an example. In the angular velocity detection device 1 according to Modification Example 1 in FIG. 12, the detection signal output from the stationary detection electrode 140 of the angular velocity detection element 10 is input to the inverting input terminal of the operational amplifier 310A, and the quadrature correction signal output from the phase adjustment circuit 38 is input to the inverting input terminal through a resistor 41.

Furthermore, the phase of the output signal (output signal of the operational amplifier 310A) of the Q/V converter 31A advances by 90° with respect to input signal. Accordingly, it is necessary to retard the phase of the quadrature correction signal by 90° with respect to the embodiments. According to this, an output signal (an example of a signal based on drive oscillation) of the phase adjustment unit 27A, which is obtained by retarding the phase of the AC voltage signal MNT by 90°, is input to the amplitude adjustment circuit 35 instead of the AC voltage signal MNT.

According to the angular velocity detection device according to Modification Example 1, it is possible to exhibit the same effect as in the above-described embodiments.

2-2. Modification Example 2

In the above-described embodiments, the addition circuit 36 is provided on a rear stage side of the Q/V converter 31A, but the addition circuit 36 may be provided on a rear stage side of the Q/V converter 31B. For example, the addition circuit 36 may be provided on a rear stage side of the Q/V converter 31B, and the inverting amplifier circuit 37 may be provided on a rear stage side of the Q/V converter 31A. In addition, the addition circuit 36 may be provided on both of the rear stage sides of the Q/V converter 31A and the Q/V converter 31B.

Figure 13:
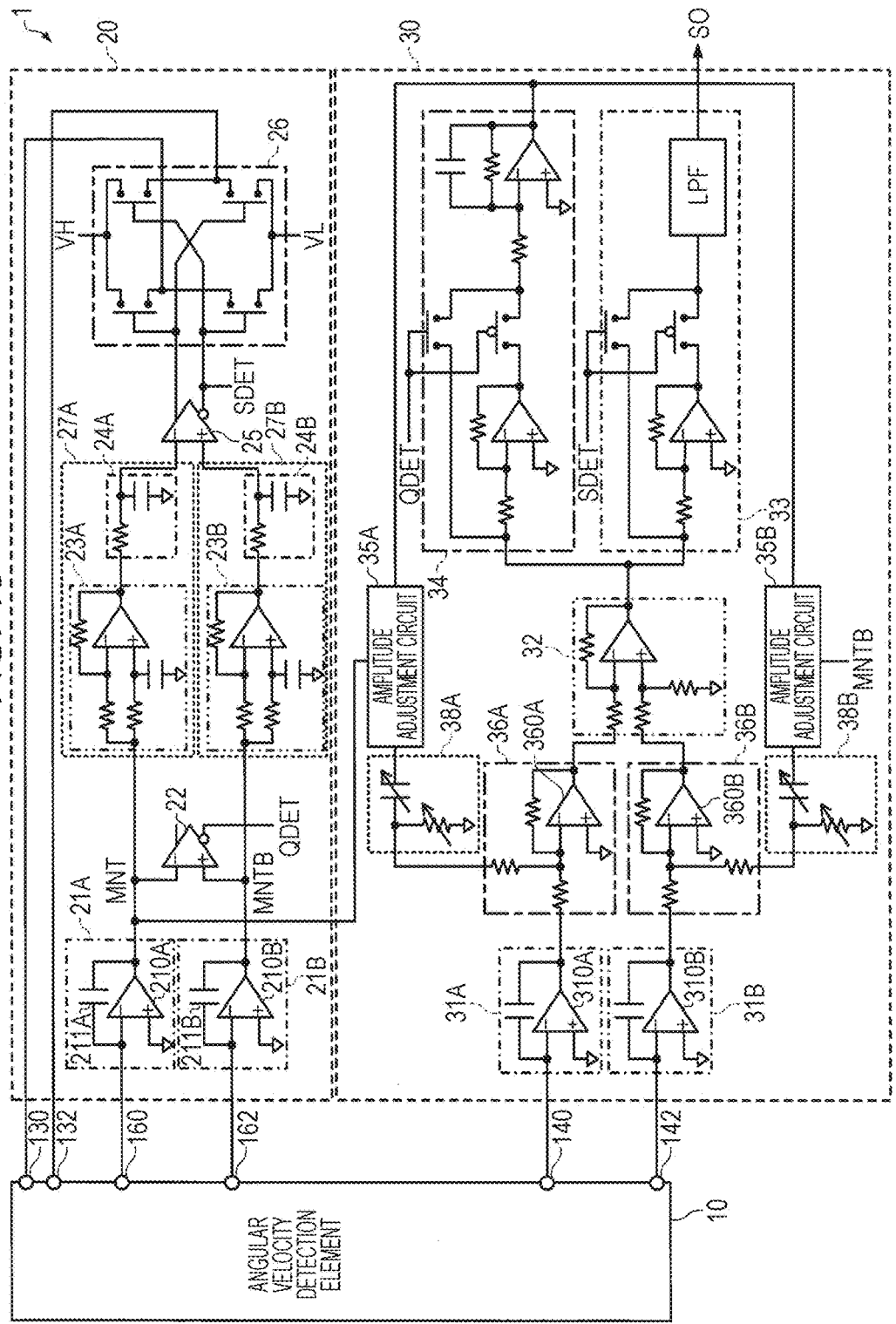
FIG. 13 is a view illustrating a configuration of an angular velocity detection device according to Modification Example 2.

FIG. 13 illustrates a configuration of an angular velocity detection device 1 according to Modification Example 2 with respect to the angular velocity detection device 1 (FIG. 9) according to the second embodiment as an example. In the angular velocity detection device 1 according to Modification Example 2 illustrated in FIG. 13, an addition circuit 36A is provided on a rear stage side of the Q/V converter 31A, and an addition circuit 36B is provided on a rear stage side of the Q/V converter 31B. In addition, the angular velocity detection circuit 30 includes two amplitude adjustment circuits 35A and 35B, and two phase adjustment circuits 38A and 38B.

A signal that is output from the quadrature synchronous detection circuit 34 is input to each of the amplitude adjustment circuits 35A and 35B. The amplitude adjustment circuit 35A outputs a signal obtained by adjusting an amplitude of the AC voltage signal MNT so as to cancel a part of the quadrature signal (leakage signal) that is input to the Q/V converters 31A and 31B in correspondence with the output signal of the quadrature synchronous detection circuit 34. Similarly, the amplitude adjustment circuit 35B outputs a signal obtained by adjusting an amplitude of the AC voltage signal MNTB so as to cancel a part of the quadrature signal (leakage signal) that is input to the Q/V converters 31A and 31B in correspondence with the output signal of the quadrature synchronous detection circuit 34. The signals, which are respectively output from the amplitude adjustment circuits 35A and 35B, are AC voltage signals which have the same frequency as the oscillation frequency (frequency of the quadrature signal (leakage signal)) and have an amplitude that is determined in accordance with the magnitude of the quadrature signal (leakage signal). In addition, the AC voltage signals, which are output from the amplitude adjustment circuits 35A and 35B, respectively pass through the phase adjustment circuits 38A and 38B, and are input to the inverting input terminals of the operational amplifiers 360A and 360B, which are respectively provided to the addition circuits 36A and 36B, through a resistor as a quadrature correction signal.

For example, the amplitude and the phase of the quadrature correction signals which are input to the addition circuits 36A and 36B are adjusted by the amplitude adjustment circuits 35A and 35B and the phase adjustment circuits 38A and 38B so that the level of the output signal of the quadrature synchronous detection circuit 34 becomes the minimum. According to this, feedback is performed so that the amplitude of the quadrature signal (leakage signal) included in the output signal of the differential amplifier 32 is attenuated.

That is, the quadrature correction signal, which is input to the inverting input terminals of the operational amplifiers 360A and 360B, acts to remove the quadrature signal (leakage signal) included in currents which are respectively input from the stationary detection electrodes 140 and 142 of the angular velocity detection element 10 to the inverting input terminals of the operational amplifiers 310A and 310B. Accordingly, in the output signal of the differential amplifier 32, the quadrature signal (leakage signal) is greatly attenuated. As a result, it is possible to reduce an offset of the angular velocity signal SO that occurs due to the quadrature signal (leakage signal).

According to the angular velocity detection device according to Modification Example 2, it is possible to exhibit the same effect as in the above-described embodiments.

2-3. Other Modification Examples

In the above-described embodiments, the phase of the quadrature correction signal may be retarded by 90°, and the Q/V converters 31A and 31B may be substituted with I/V converters. In addition, in the above-described embodiments, the amplitude adjustment circuit 35 may not be provided. In addition, in the above-described embodiments, the inverting amplifier circuit 37 may not be provided. In addition, in the above-described embodiments, a part of quadrature correction signals may be input to at least one of the inverting input terminal of the operational amplifier 310B and the inverting input terminal of the operational amplifier 310A through a capacitor.

3. Electronic Apparatus

Figure 14:
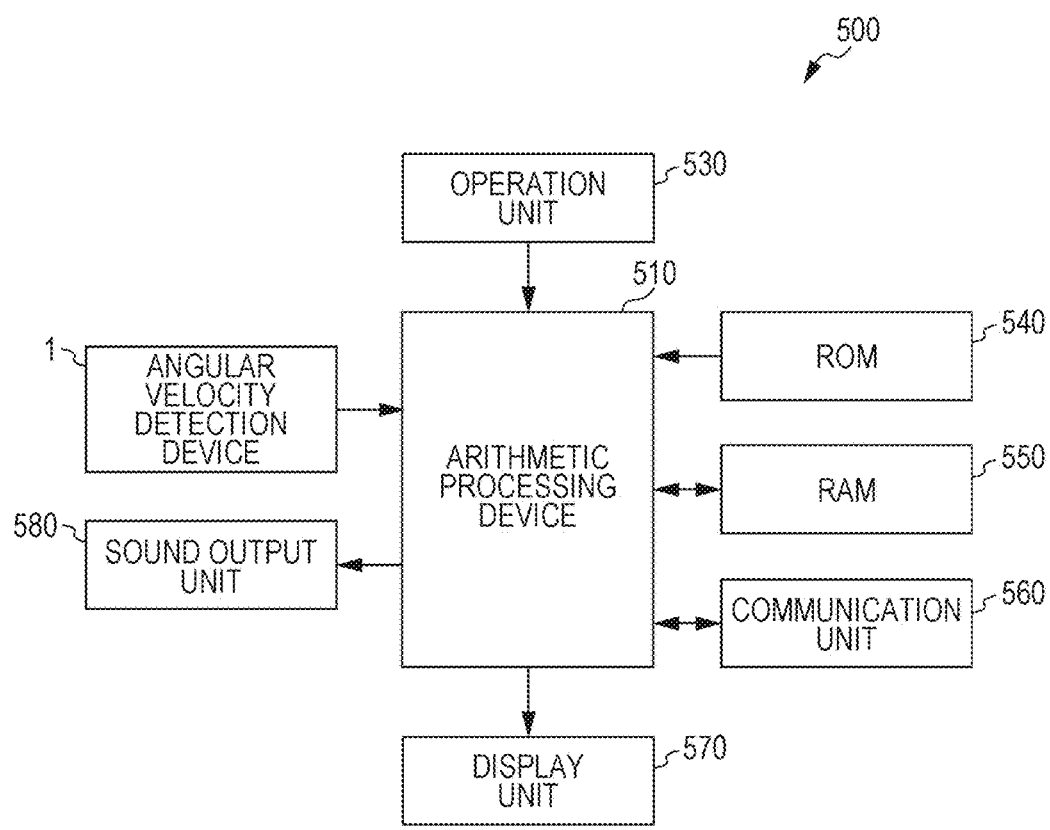
FIG. 14 is a functional block diagram illustrating a configuration of an electronic apparatus according to this embodiment.

FIG. 14 is a functional block diagram of an electronic apparatus 500 according to this embodiment. Furthermore, the same reference numeral will be given to the same configuration as in the above-described embodiments, and description thereof will not be repeated.

The electronic apparatus 500 according to this embodiment is an electronic apparatus 500 including the angular velocity detection device 1. In an example illustrated in FIG. 14, the electronic apparatus 500 includes the angular velocity detection device 1, an arithmetic processing device 510, an operation unit 530, a read only memory (ROM) 540, a random access memory (RAM) 550, a communication unit 560, a display unit 570, and a sound output unit 580. Furthermore, in the electronic apparatus 500 according to this embodiment, a part of the constituent elements (respective units) illustrated in FIG. 14 may be omitted or changed, or a configuration to which other constituent elements are added may be employed.

The arithmetic processing device 510 performs various kinds of computation processing or control processing in accordance with a program that is stored in the ROM 540 and the like. Specifically, the arithmetic processing device 510 performs various kinds of processing corresponding to an output signal of the angular velocity detection device 1 or an operation signal transmitted from the operation unit 530, processing of controlling the communication unit 560 to make a data communication with the outside, processing of transmitting a display signal for displaying various pieces of information on the display unit 570, processing of outputting various kinds of sound on the sound output unit 580, and the like.

The operation unit 530 in an input device that is constituted by an operation key, a button switch, and the like, and outputs an operation signal corresponding to an operation by a user to the arithmetic processing device 510.

The ROM 540 stores a program or data for execution of various kinds of computation processing or control processing by the arithmetic processing device 510, and the like.

The RAM 550 is used as a work area of the arithmetic processing device 510, and temporarily stores a program or data which is read out from the ROM 540, data that is input from the operation unit 530, results obtained through computation executed by the arithmetic processing device 510 in accordance with various programs, and the like.

The communication unit 560 performs various controls for establishing a data communication between the arithmetic processing device 510 and an external device.

The display unit 570 is a display device that is constituted by a liquid crystal display (LCD), an electrophoresis display, and the like, and displays various pieces of information on the basis of a display signal that is input from the arithmetic processing device 510.

In addition, the sound output unit 580 is a device such as a speaker that outputs sound.

The electronic apparatus 500 according to this embodiment includes the angular velocity detection device 1 capable of further improving S/N of the angular velocity signal in comparison to the related art. Accordingly, it is possible to realize the electronic apparatus 500 capable of performing processing (for example, a control corresponding to a posture, and the like) based on a variation of an angular velocity with higher accuracy.

As the electronic apparatus 500, various electronic apparatuses may be considered. Examples of the electronic apparatus 500 include a personal computer (for example, a mobile type personal computer, a laptop type personal computer, and a tablet type personal computer), a mobile terminal such as a portable phone, a digital still camera, an ink jet type ejection device (for example, an ink jet printer), a storage area network device such as a router and a switch, a local area network apparatus, an apparatus for a mobile terminal base station, a television, a video camera, a video tape recorder, a car navigation device, a pager, an electronic organizer (also including one equipped with a communication function), an electronic dictionary, a calculator, an electronic gaming machine, a game controller, a word processor, a workstation, a videophone, a security television monitor, electronic binoculars, a point of sale (POS) terminal, a medical apparatus (for example, an electronic thermometer, a blood pressure meter, a blood glucose meter, an electrocardiogram measurement device, an ultrasonic diagnostic apparatus, and an electronic endoscope), a fish finder, various measurement apparatuses, meters (for example, meters of a vehicle, an aircraft, and a ship), a flight simulator, a head-mounted display, a motion tracer, a motion tracking device, a motion controller, a pedestrian dead reckoning (PDR) device, and the like.

Figure 15A:
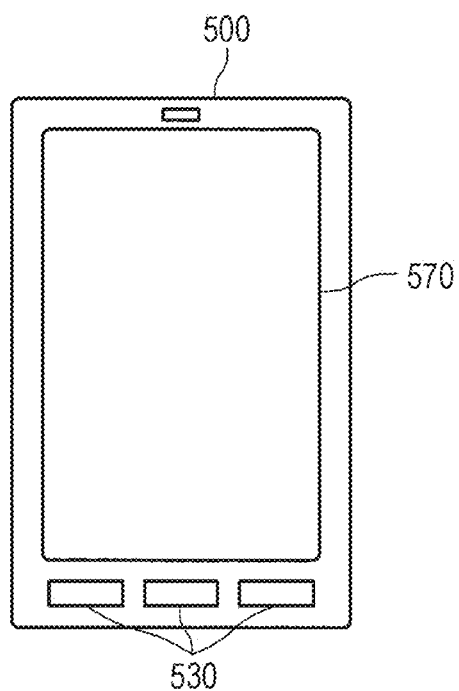
FIG. 15A is a view illustrating an example of an external appearance of a smart phone that is an example of the electronic apparatus.
Figure 15B:
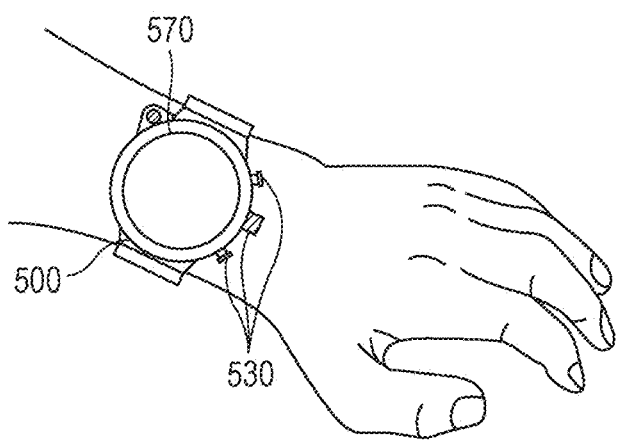
FIG. 15B is a view illustrating an example of an external appearance of an arm-mounted portable apparatus that is an example of the electronic apparatus.

FIG. 15A is a view illustrating an example of an external appearance of a smart phone that is an example of the electronic apparatus 500, and FIG. 15B is a view illustrating an example of an external appearance of an arm-mounted portable apparatus as an example of the electronic apparatus 500. The smart phone that is the electronic apparatus 500 illustrated in FIG. 15A includes a button as the operation unit 530, and an LCD as the display unit 570. The arm-mounted portable apparatus that is the electronic apparatus 500 illustrated in FIG. 15B includes a button and a stem as the operation unit 530 and an LCD as the display unit 570. The electronic apparatus 500 includes the angular velocity detection device 1 capable of improving S/N of the angular velocity signal. Accordingly, it is possible to realize the electronic apparatus 500 capable of performing processing (a display control corresponding to a posture, and the like) based on a variation of an angular velocity with higher accuracy.

4. Moving Object

Figure 16:
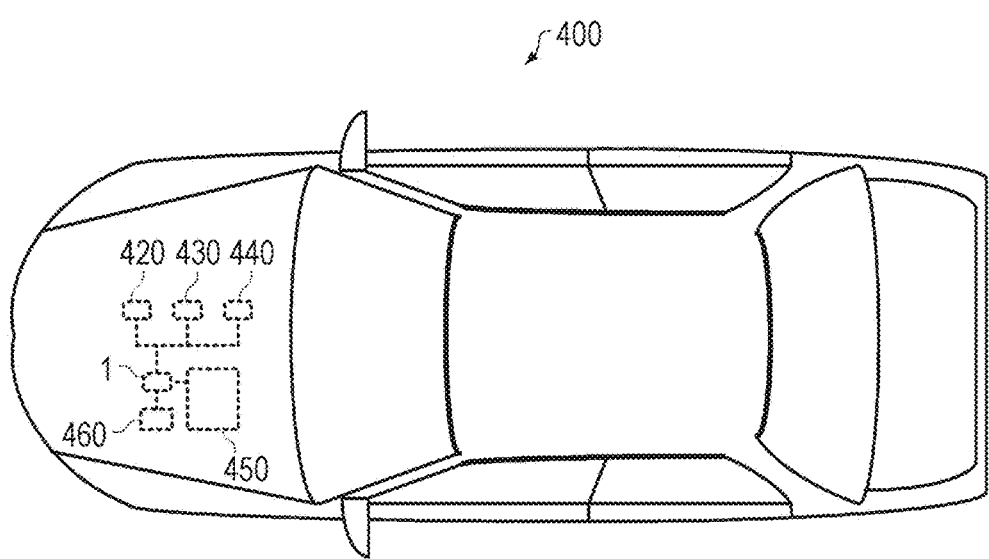
FIG. 16 is a view (top view) illustrating an example of a moving object according to this embodiment.

FIG. 16 is a view (top view) illustrating an example of a moving object 400 according to this embodiment. Furthermore, the same reference numeral will be given to the same configuration as in the above-described embodiments, and description thereof will not be repeated.

The moving object 400 according to this embodiment is a moving object 400 including the angular velocity detection device 1. In an example illustrated in FIG. 16, the moving object 400 includes a controller 420, a controller 430, and a controller 440 which perform various controls of an engine system, a brake system, a keyless entry system, and the like, a battery 450, and a backup battery 460. Furthermore, in the moving object 400 according to this embodiment, a part of the constituent element (respective units) illustrated in FIG. 16 may be omitted or changed, and a configuration to which other constituent elements are added may be employed.

The moving object 400 according to this embodiment includes the angular velocity detection device 1 capable of improving S/N of the angular velocity signal. Accordingly, it is possible to realize the moving object 400 capable of performing processing (for example, a control of suppressing side slipping or overturning, and the like) based on a variation of an angular velocity with higher accuracy.

As the moving object 400, various moving objects may be considered, and examples thereof include a vehicle (also including an electric vehicle), an aircraft such as a jet airplane and a helicopter, a ship, a rocket, a satellite, and the like.

The invention is not limited to this embodiment, and can be executed by various modifications in a range of the gist of the invention.

The above-described embodiments and modification examples are illustrative only, and there is no limitation thereto. For example, the above-described embodiments and modification examples may be appropriately combined.

The invention includes substantially the same configuration (for example, a configuration in which a function, a method, and a result are the same, or a configuration in which an object and an effect are the same) as the configuration described in the embodiments. In addition, the invention includes a configuration in which substitution is made to portions that are not essential in the configuration described in the embodiments. In addition, the invention includes a configuration capable of exhibiting the same operational effect as in the configuration described in the embodiments or a configuration capable of achieving the same object. In addition, the invention includes a configuration in which a known technology is added to the configuration described in the embodiments.

The entire disclosure of Japanese Patent Application No: 2016-042347, filed Mar. 4, 2016 is expressly incorporated by reference herein.

What is claimed is:

1. An angular velocity detection circuit, comprising:
   a first conversion unit that converts a first detection signal, which is output from a first detection electrode of an angular velocity detection element, into a voltage;
   a second conversion unit that converts a second detection signal, which is output from a second detection electrode of the angular velocity detection element, into a voltage;
   an angular velocity signal generation unit which includes a differential amplifier unit that differentially amplifies a signal based on an output signal of the first conversion unit and a signal based on an output signal of the second conversion unit, and which generates an angular velocity signal on the basis of an output signal of the differential amplifier unit; and
   a correction signal generation unit that generates a quadrature correction signal for reducing an offset of the angular velocity signal which occurs due to quadrature leakage signals which are respectively included in the first detection signal and the second detection signal on the basis of a signal based on drive oscillation of the angular velocity detection element,
   wherein the quadrature correction signal is input to a circuit that is located on a first signal path ranging from the first detection electrode to the differential amplifier unit.

2. The angular velocity detection circuit according to claim 1,
wherein the quadrature correction signal is input to a circuit on a rear stage side of the first conversion unit.

3. The angular velocity detection circuit according to claim 1, further comprising:
an addition circuit that is provided on the first signal path, and adds an output signal of the first conversion unit and the quadrature correction signal to each other.

4. The angular velocity detection circuit according to claim 1,
wherein the quadrature correction signal is not input to a circuit that is located on a second signal path ranging from the second detection electrode to the differential amplifier unit.

5. The angular velocity detection circuit according to claim 1,
wherein the correction signal generation unit includes an amplitude adjustment unit that adjusts an amplitude of the quadrature correction signal.

6. The angular velocity detection circuit according to claim 5,
wherein the correction signal generation unit includes a synchronous detection circuit that detects a level of the quadrature leakage signal that is included in the first detection signal and the second detection signal on the basis of an output signal of the differential amplifier unit, and
the amplitude adjustment unit adjusts an amplitude of the quadrature correction signal on the basis of the level of the quadrature leakage signal which is detected by the synchronous detection circuit.

7. The angular velocity detection circuit according to claim 5,
wherein the amplitude adjustment unit adjusts the amplitude of the quadrature correction signal on the basis of information that is stored in a storage unit.

8. The angular velocity detection circuit according to claim 1,
the correction signal generation unit includes a phase adjustment unit that adjusts a phase of the quadrature correction signal.

9. The angular velocity detection circuit according to claim 1,
wherein a power supply voltage of the first conversion unit and the second conversion unit is higher than a power supply voltage of the differential amplifier unit.

10. An angular velocity detection device, comprising:
the angular velocity detection circuit according to claim 1;
a drive circuit that drives the angular velocity detection element; and
an angular velocity detection element.

11. An electronic apparatus, comprising:
the angular velocity detection device according to claim 10.

12. A moving object, comprising:
the angular velocity detection device according to claim 10.

* * * * *